United States Patent
Kim et al.

(10) Patent No.: US 12,118,959 B2
(45) Date of Patent: Oct. 15, 2024

(54) GAMMA VOLTAGE GENERATING CIRCUIT, SOURCE DRIVER AND DISPLAY DEVICE INCLUDING THE SAME

(71) Applicant: Samsung Display Co., Ltd., Yongin-si (KR)

(72) Inventors: Su Bin Kim, Yongin-si (KR); Se Byung Chae, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/136,299

(22) Filed: Apr. 18, 2023

(65) Prior Publication Data

US 2023/0252956 A1    Aug. 10, 2023

Related U.S. Application Data

(63) Continuation of application No. 17/694,624, filed on Mar. 14, 2022, now abandoned, which is a
(Continued)

(30) Foreign Application Priority Data

Mar. 7, 2019 (KR) .................. 10-2019-0026480
Apr. 30, 2019 (KR) .................. 10-2019-0050928

(51) Int. Cl.
   *G09G 5/10*   (2006.01)
   *G09G 3/20*   (2006.01)
   (Continued)

(52) U.S. Cl.
   CPC ............. *G09G 5/10* (2013.01); *G06F 1/3265* (2013.01); *G09G 3/2007* (2013.01);
   (Continued)

(58) Field of Classification Search
   CPC ............. G09G 5/10; G09G 2310/0267; G09G 2310/027; G09G 2320/0673;
   (Continued)

(56) References Cited

U.S. PATENT DOCUMENTS 9,135,853 B2   9/2015  Kim et al.
9,837,040 B2  12/2017  Moon et al.
(Continued)

FOREIGN PATENT DOCUMENTS

CN   102129847 A   7/2011
CN   105489175 A   4/2016
(Continued)

OTHER PUBLICATIONS

Non-Final Office Action mailed Feb. 25, 2021, in U.S. Appl. No. 16/805,804.
(Continued)

*Primary Examiner* — Douglas M Wilson
(74) *Attorney, Agent, or Firm* — CANTOR COLBURN LLP

(57) ABSTRACT

A display device including a display panel including a scan line, a data line, and a pixel connected thereto, a gate driver, and a source driver including a gamma voltage generator to generate gamma voltages having different voltage levels, a digital-to-analog converter to generate the data voltage corresponding to a gray scale value using the gamma voltages, and a source buffer, in which the gamma voltage generator includes a first resistor string to set a voltage range of the gamma voltages, a second resistor string to set tab gamma voltages corresponding to some of the gamma voltages within the voltage range, gamma buffers to output the tab gamma voltages, and a third resistor string including tabs respectively connected to output terminals of the gamma buffers, the third resistor string being configured to
(Continued)

divide a voltage between the tabs to generate the gamma voltages.

20 Claims, 14 Drawing Sheets

Related U.S. Application Data continuation of application No. 16/805,804, filed on Mar. 1, 2020, now Pat. No. 11,276,370.

(51) Int. Cl.
*G09G 3/3275* (2016.01)
*G09G 3/36* (2006.01)
*G06F 1/3234* (2019.01)
*G09G 3/3208* (2016.01)

(52) U.S. Cl.
CPC ......... *G09G 3/3208* (2013.01); *G09G 3/3275* (2013.01); *G09G 3/3696* (2013.01); *G09G 2310/0267* (2013.01); *G09G 2310/027* (2013.01); *G09G 2310/0291* (2013.01); *G09G 2310/061* (2013.01); *G09G 2310/08* (2013.01); *G09G 2320/0276* (2013.01); *G09G 2320/0673* (2013.01); *G09G 2330/021* (2013.01); *G09G 2330/022* (2013.01); *G09G 2330/028* (2013.01); *G09G 2340/0435* (2013.01)

(58) Field of Classification Search
CPC .... G09G 2310/08; G09G 3/3275; G09G 5/18; G09G 2320/0276; G09G 3/3208; G09G 3/2007; G09G 2330/021; G09G 2330/022; G09G 2330/028; G09G 3/3696; G09G 2310/0291; G09G 2340/0435; G09G 2310/061; G06F 1/3265
See application file for complete search history.

(56) References Cited

U.S. PATENT DOCUMENTS

| | | | |
|---|---|---|---|
| 9,842,560 B2 | 12/2017 | Kim et al. | |
| 9,978,332 B2 | 5/2018 | Lee et al. | |
| 10,424,265 B2 | 9/2019 | Kim | |
| 11,276,370 B2 | 3/2022 | Kim et al. | |
| 2010/0265274 A1 | 10/2010 | Han et al. | |
| 2011/0175942 A1 | 7/2011 | Ahn et al. | |
| 2012/0032935 A1 | 2/2012 | Yen | |
| 2013/0271507 A1* | 10/2013 | Kim | G09G 3/3291 345/77 |
| 2015/0325200 A1 | 11/2015 | Rho et al. | |
| 2016/0098959 A1 | 4/2016 | Moon et al. | |
| 2016/0098966 A1* | 4/2016 | Kim | G09G 3/3614 345/690 |
| 2016/0118000 A1 | 4/2016 | Kim | |
| 2018/0286317 A1 | 10/2018 | Park et al. | |
| 2019/0107883 A1* | 4/2019 | Ma | G06F 1/3265 |

FOREIGN PATENT DOCUMENTS

| | | |
|---|---|---|
| CN | 105551445 A | 5/2016 |
| CN | 105575344 A | 5/2016 |
| KR | 10-2005-0113852 | 12/2005 |
| KR | 1020130117904 A | 10/2013 |
| KR | 10-2015-0094872 | 8/2015 |
| KR | 10-2015-0127500 | 11/2015 |
| KR | 10-2016-0040809 | 4/2016 |
| KR | 10-2016-0041103 | 4/2016 |
| KR | 10-2016-0047270 | 5/2016 |
| KR | 10-2018-0032305 | 3/2018 |
| KR | 10-2018-0043563 | 4/2018 |
| KR | 10-2018-0111713 | 10/2018 |

OTHER PUBLICATIONS

Final Office Action mailed Jul. 26, 2021, in U.S. Appl. No. 16/805,804.
Advisory Action mailed Oct. 7, 2021, in U.S. Appl. No. 16/805,804.
Notice of Allowance mailed Nov. 8, 2021, in U.S. Appl. No. 16/805,804.
Non-Final Office Action dated Sep. 6, 2022, in U.S. Appl. No. 17/694,624.
Office Action dated Sep. 1, 2023, issued to corresponding Korean Patent Application No. 10-2019-0050928 (with English Translation.

* cited by examiner

GAMMA VOLTAGE GENERATING CIRCUIT, SOURCE DRIVER AND DISPLAY DEVICE INCLUDING THE SAME

CROSS REFERENCE TO RELATED APPLICATIONS

This application is a Continuation of U.S. patent application Ser. No. 17/694,624, filed on Mar. 14, 2022, which is a Continuation of U.S. patent application Ser. No. 16/805,804, filed Mar. 1, 2020, now issued as U.S. Pat. No. 11,276,370, which claims priority to and the benefit of Korean Patent Application Nos. 10-2019-0026480 filed on Mar. 7, 2019, and 10-2019-0050928, filed on Apr. 30, 2019, each of which is hereby incorporated by reference for all purposes as if fully set forth herein.

BACKGROUND

Field

Exemplary embodiments of the invention relate generally to a gamma voltage generating circuit, a source driver, and a display device including the gamma voltage generating circuit.

Discussion of the Background

A display device includes a display panel and a driver. The display panel includes scan lines, data lines, and pixels. The driver includes a scan driver that sequentially supplies scan signals to the scan lines and a data driver that provides data signals to the data lines. Each of the pixels may emit light with a luminance corresponding to the data signal provided through the corresponding data line in response to the scan signal provided through the corresponding scan line.

The data driver may generate gamma voltages corresponding to a plurality of gray scales, and may convert a gray scale value of image data into the data signal using the gamma voltage.

A range of the gamma voltages may change depending on the luminance, and, in some cases, characteristics of the gamma voltages having the changed voltage levels may differ from an ideal gamma voltage.

The above information disclosed in this Background section is only for understanding of the background of the inventive concepts, and, therefore, it may contain information that does not constitute prior art.

SUMMARY

A gamma voltage generating circuit constructed according to exemplary embodiments of the invention generates an ideal gamma voltage, and a source driver, and a display device including the gamma voltage generating circuit.

Additional features of the inventive concepts will be set forth in the description which follows, and in part will be apparent from the description, or may be learned by practice of the inventive concepts.

A display device according to an exemplary embodiment includes a display unit including a scan line, a data line, and a pixel connected to the scan line and the data line, a gate driver configured to supply a scan signal to the scan line, and a source driver configured to supply a data voltage to the data line, in which the source driver includes a gamma voltage generator configured to generate gamma voltages having voltage levels different from each other in response to a gamma enable signal, a digital-to-analog converter configured to generate the data voltage corresponding to a gray scale value using the gamma voltages, and a source buffer configured to output the data voltage to the data line, the gamma voltage generator includes a first resistor string configured to set a voltage range of the gamma voltages, gamma buffers configured to output selected voltages among divided voltages within the voltage range, and a second resistor string including tabs respectively connected to output terminals of the gamma buffers, the second resistor string being configured to divide a voltage between the tabs to generate the gamma voltages, and at least some of the gamma buffers are configured to be turned on in a first period and turned off in a second period different from the first period. The gamma voltage generator may include a digital gamma voltage generator.

The gamma voltage generator may further include a first buffer configured to apply a maximum gamma voltage to one terminal of the first resistor string, and a second buffer configured to apply a minimum gamma voltage to another terminal of the first resistor string, and the minimum gamma voltage of the second buffer may be changed according to a display luminance of the display unit.

The gamma voltages may be non-linear in the first period and linear in the second period.

The first period and the second period may be included in one horizontal period, and the source driver may be configured to supply the data voltage to the data line at intervals of the one horizontal period.

The scan signal may have a turn-off voltage level in the first period and a turn-on voltage level in the second period.

At least some of the gamma buffers may be turned off at a point of time when the scan signal is shifted from a turn-off voltage level to a turn-on voltage level.

At least some of the gamma buffers may be turned off after a point of time when the scan signal is shifted from a turn-off voltage level to a turn-on voltage level.

A first gamma buffer of the gamma buffers connected to an uppermost tab of the second resistor string may maintain a turn-on state in the second period, and a second gamma buffer of the gamma buffers connected to a lowermost tab of the second resistor string may maintain the turn-on state in the second period.

The remaining gamma buffers except for the first and second gamma buffers may be turned off in the second period.

A third gamma buffer of the gamma buffers that is farthest from the first and second gamma buffers may maintain a turn-on state in the second period.

A fourth gamma buffer of the gamma buffers that is adjacent to the first gamma buffer or the second gamma buffer may maintain a turn-on state in the second period.

A frame period may include a display period in which an image is displayed and a porch period between the display period and another display period, the display period may include the first period and the second period, the source buffer may be turned off in the porch period and is turned on in the display period, and at least some of the gamma buffers may be turned off in the porch period and are turned on in the display period.

At least some of the gamma buffers may be turned off after a point of time when the porch period starts and turned on before a point of time when the porch period ends.

The display period may include a black period in which a black data voltage corresponding to a black color is provided and a valid period different from the black period, the source buffer may be turned off in the black period and turned on in the valid period, and at least some of the gamma buffers may be turned off in the black period and turned on in the valid period.

The first period and the second period may be included in the valid period.

The first gamma buffer connected to an uppermost tab of the second resistor string may maintain a turn-on state in the black period, and the remaining gamma buffers except for the first gamma buffer may be turned off.

The at least some of the gamma buffers may be turned off after a point of time when the black period starts and turned on before a point of time when the black period ends.

A source driver according to another exemplary embodiment includes a gamma voltage generator configured to generate gamma voltages having voltage levels different from each other in response to a gamma enable signal, a digital-to-analog converter configured to generate a data voltage corresponding to a gray scale value using the gamma voltages, and a source buffers configured to output the data voltage, in which the gamma voltage generator includes a first resistor string configured to set a voltage range of the gamma voltages, gamma buffers configured to output selected voltages from divided voltages within the voltage range, and a second resistor string including tabs respectively connected to output terminals of the gamma buffers, the second resistor string being configured to divide a voltage between the tabs to generate the gamma voltages, and at least some of the gamma buffers may be configured to be turned on in a first period and turned off in a second period different from the first period.

A gamma voltage generating circuit according to still another exemplary embodiment includes a first resistor string configured to set a voltage range of gamma voltages, gamma buffers configured to output selected voltages from divided voltages within the voltage range, and a second resistor string including tabs respectively connected to output terminals of the gamma buffers, the second resistor string being configured to divide a voltage between the tabs to generate the gamma voltages, in which at least some of the gamma buffers are configured to be turned on in a first period and turned off in a second period different from the first period.

Additional features of the inventive concepts will be set forth in the description which follows, and in part will be apparent from the description, or may be learned by practice of the inventive concepts.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
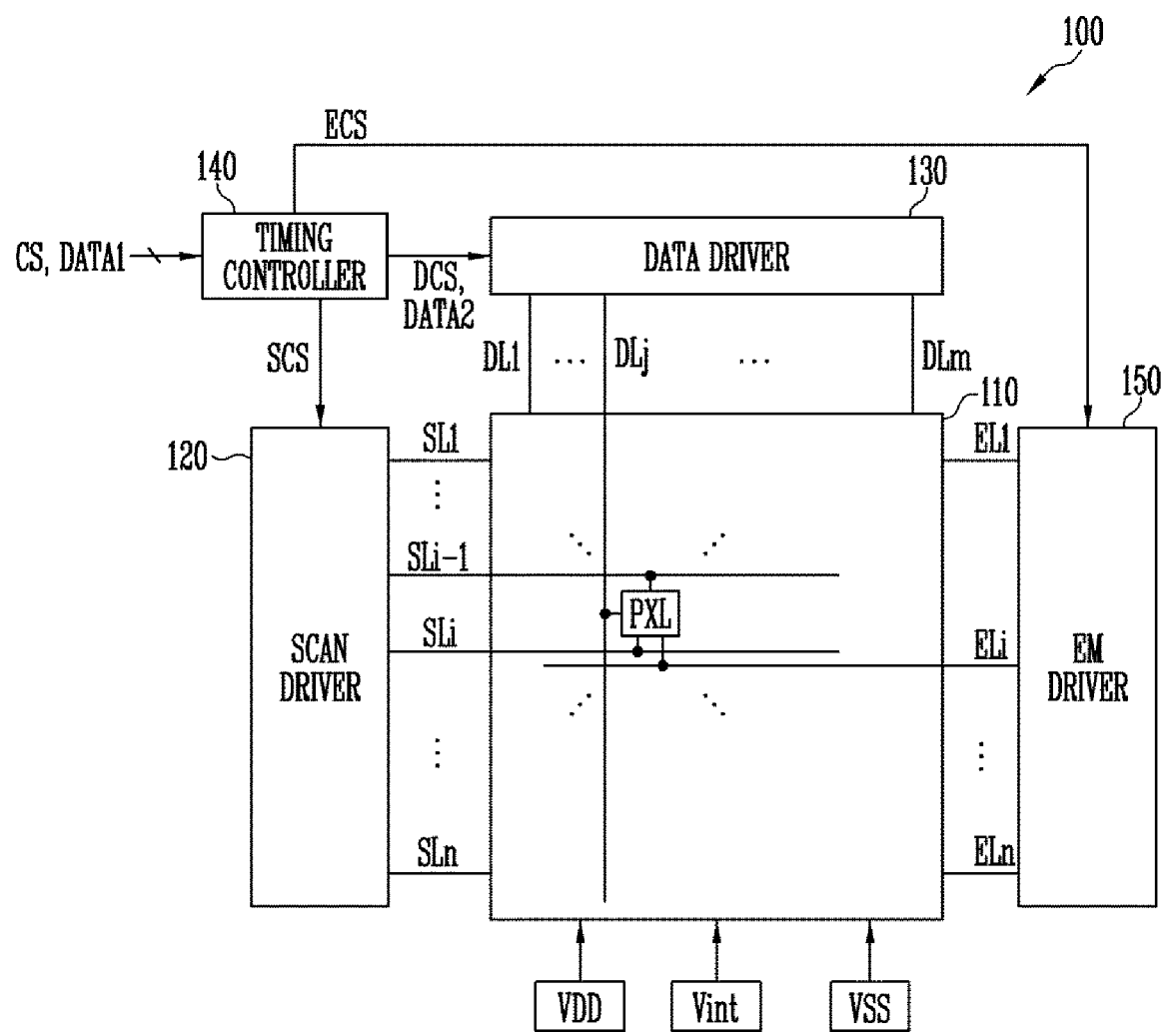
FIG. 1 is a block diagram of a display device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a block diagram of a display device according to an exemplary embodiment.

Referring to FIG. 1, a display device 100 may include a display unit 110 (or a display panel), a scan driver 120 (or a gate driver), a data driver 130 (or a source driver), a timing controller 140, and a light emitting driver 150 (or an emission EM driver).

The display unit 110 may include scan lines SL1 to SLn (n is a positive integer) (or gate lines), data lines DL1 to DLm (m is a positive integer), light emission control lines EL1 to ELn, and pixels PXL. The pixels PXL may be disposed in areas, such as in pixel areas, partitioned by the scan lines SL1 to SLn, the data lines DL1 to DLm, and the light emission control lines EL1 to ELn.

The pixel PXL may be connected to at least one of the scan lines SL1 to SLn, one of the data lines DL1 to DLm, and at least one of the light emission control lines EL1 to ELn. For example, the pixel PXL may be connected to the scan line SLi, the previous scan line SLi−1 adjacent to the scan line SLi, the data line DLj, and the light emission control line ELi (i and j are positive integers).

The pixel PXL may be initialized in response to a scan signal (or a scan signal provided at a previous time, or a previous gate signal) provided through the previous scan line SLi−1, store or record a data signal provided through the data line DLj in response to the scan signal (or the scan signal provided at a current point of time, or a gate signal) provided through the scan line SLi, and emit light with a luminance corresponding to the stored data signal in response to a light emission control signal provided through the light emission control line ELi.

The display unit 110 may receive first and second power supply voltages VDD and VSS. The power supply voltages VDD and VSS may be used for an operation of the pixel PXL, and the first power supply voltage VDD may have a voltage level higher than a voltage level of the second power supply voltage VSS. An initialization power supply voltage Vint may be provided to the display unit 110. The first and second power supply voltages VDD and VSS and the initialization power supply voltage Vint may be provided to the display unit 110 from a separate power supply unit.

The scan driver 120 may generate a scan signal based on a scan control signal SCS, and may sequentially provide the scan signal to the scan lines SL1 to SLn. The scan control signal SCS may include a start signal, clock signals, and the like, and may be provided from a timing controller 140. For example, the scan driver 120 may include a shift register (or a stage) that sequentially generates and outputs a pulse-shaped scan signal corresponding to a pulse-shaped start signal using the clock signals.

The light emitting driver 150 may generate a light emission control signal based on a light emission drive control signal ECS, and may provide the light emission control signal to the light emission control lines EL1 to ELn sequentially or simultaneously. The light emission drive control signal ECS may include a light emission start signal, light emission clock signals, and the like, which may be provided from the timing controller 140. For example, the light emitting driver 150 may include a shift register that sequentially generates and outputs pulse-shaped light emission control signals corresponding to the pulse-shaped light emission start signal using the light emission clock signals.

The data driver 130 may generate data signals based on image data DATA2 and a data control signal DCS provided from the timing controller 140, and outputs the data signals to the display unit 110 (or the pixel PXL). The data control signal DCS controls an operation of the data driver 130 and may include a load signal (or a data enable signal) for instructing an output of a valid data signal.

The data driver 130 according to an exemplary embodiment may generate gamma voltages and output a data signal (or a data voltage) by selecting one of the gamma voltages corresponding to a gray scale values of the image data DATA2. The data driver 130 may output at least some (for example, representative gamma voltages) of the gamma voltages through gamma buffers (or gamma amplifiers), and periodically turn off at least some of the gamma buffers.

An overall voltage range of the gamma voltages and target voltage levels of the gamma voltages may be changed depending on a luminance. In this case, actual voltage levels of the gamma voltages output from the gamma buffers, which may be based on offsets (or offset voltages, differences between an ideal output voltage and the actual output voltages) of the gamma buffers, may have errors as compared to target voltage levels. That is, the gamma voltages output from the gamma buffers may have non-linear characteristics. Accordingly, the display device 100 (or the data driver 130) according to an exemplary embodiment may turn on the gamma buffers in a first period, and turn off at least some (for example, gamma buffers that output intermediate gamma voltages corresponding to intermediate gray scales) of the gamma buffers in a second period. The second period may be a data signal generation period, in which a data signal is generated by selecting one of the gamma voltages corresponding to a gray scale value, and the first period may be a period prior to the second period. In this case, the gamma voltages are rapidly changed or charged to voltage levels similar to the target voltage levels by the turned-on gamma buffers during the first period, and the offset components of the gamma buffers are removed during the second period. In this manner, linearity of each of the gamma voltages (in particular, the intermediate gamma voltages) may be ensured.

A configuration for generating the gamma voltages and a configuration for controlling the gamma buffers will be described in more detail below with reference to FIGS. 5 to 11.

The data driver 130 according to an exemplary embodiment may turn off at least some of the gamma buffers in a porch period (or a blank period) and a black period. The porch period may be a period between display periods (e.g., periods when images are displayed), and the black period may be a period, in which only a black image is displayed in the display period. A valid data signal is not generated in the porch period, and only the gamma voltage corresponding to a black color is required in the black period. Accordingly, power consumption of the data driver 130 (and display device 100) may be reduced.

A configuration for controlling the gamma buffers in the porch period and the black period will be described in more detail below with reference to FIGS. 12 to 14.

The timing controller 140 may receive input image data DATA1 and a control signal CS from an external device, such as a graphic processor), generate the scan control signal SCS and a data control signal DCS based on the control signal CS, and generate the image data DATA2 by converting the input image data DATA1. The control signal CS may include a vertical synchronization signal VSYNC, a horizontal synchronization signal HSYNC, a clock CLK, and the like. The vertical synchronization signal may indicate a start of frame data (e.g., data corresponding to a frame period in which one frame image is displayed), and the horizontal synchronization signal may indicate a start of a data row (e.g., one of a plurality of data rows included in frame data). For example, the timing controller 140 may convert the input image data DATA1 of an RGB format into the image data DATA2 of an RGBG format to conform to an arrangement of pixels in the display unit 110.

At least one of the scan driver 120, the data driver 130, the timing controller 140, and the light emitting driver 150 may be formed in the display unit 110, or may be realized as an integrated circuit (IC), and be connected to the display unit 110 in a form of a tape carrier package. In some exemplary embodiments, at least two of the scan driver 120, the data driver 130, the timing controller 140, and the light emitting driver 150 may be realized as a single IC.

Figure 2:
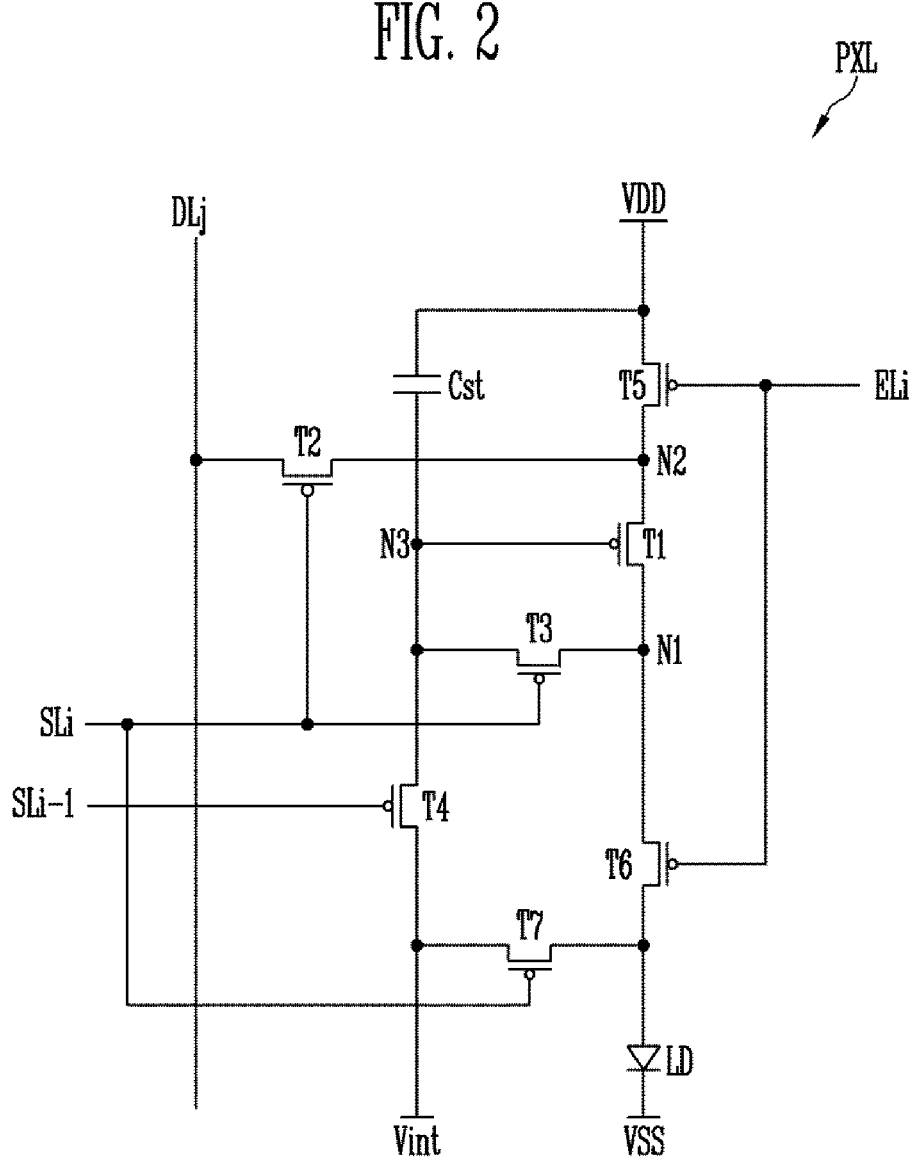
FIG. 2 is an exemplary circuit diagram of a pixel included in the display device of FIG. 1.

FIG. 2 is an exemplary circuit diagram of the pixel included in the display device of FIG. 1.

Referring to FIG. 2, the pixel PXL may include first through seventh transistors T1 through T7, a storage capacitor Cst, and a light emitting element LD.

Each of the first to seventh transistors T1 to T7 may be realized as a P-type transistor, without being limited thereto. For example, at least some of the first to seventh transistors T1 to T7 may also be realized as N-type transistors.

A first electrode of the first transistor (e.g., drive transistor) T1 may be connected to a second node N2, or may be connected to a first power supply line (e.g., the power supply line to which the first power supply voltage VDD is applied) through the fifth transistor T5. A second electrode of the first transistor T1 may be connected to a first node N1, or may be connected to an anode of the light emitting element LD via the sixth transistor T6. A gate electrode of the first transistor T1 may be connected to a third node N3. The first transistor T1 may control the amount of current flowing to the second power supply line (e.g., the power supply line transferring the second power supply voltage VSS) via the light emitting element LD from the first power supply line in correspondence with a voltage of the third node N3.

The second transistor T2 (e.g., switching transistor) may be connected between the data line DLj and the second node N2. A gate electrode of the second transistor T2 may be connected to the scan line SLi. The second transistor T2 may be turned on when a scan signal is supplied to the scan line SLi to electrically connect the data line DLj to the first electrode of the first transistor T1.

The third transistor T3 may be connected between the first node N1 and the third node N3. A gate electrode of the third transistor T3 may be connected to the scan line SLi. The third transistor T3 may be turned on when the scan signal is supplied to the scan line SLi to electrically connect the first node N1 to the third node N3. Therefore, when the third transistor T3 is turned on, the first transistor T1 may be connected in a diode form.

The storage capacitor Cst may be connected between the first power supply line and the third node N3. The storage capacitor Cst may store a data signal and a voltage corresponding to a threshold voltage of the first transistor T1.

A fourth transistor T4 may be connected between the third node N3 and an initialization power supply line (e.g., a power supply line for transferring the initialization power supply voltage Vint). A gate electrode of the fourth transistor T4 may be connected to the previous scan line SLi-1. The fourth transistor T4 may be turned on when a scan signal is supplied to the previous scan line SLi-1 to supply the initialization power supply voltage Vint to the first node N1. Here, the initialization power supply voltage Vint may be set to have a lower voltage level than the data signal.

A fifth transistor T5 may be connected between the first power supply line and the second node N2. A gate electrode of the fifth transistor T5 may be connected to the light emission control line ELi. The fifth transistor T5 may be turned off when a light emission control signal is supplied to the light emission control line ELi and may be turned on otherwise.

A sixth transistor T6 may be connected between the first node N1 and the light emitting element LD. A gate electrode of the sixth transistor T6 may be connected to the light emission control line ELi. The sixth transistor T6 may be turned off when the light emission control signal is supplied to the light emission control line ELi and may be turned on otherwise.

A seventh transistor T7 may be connected between the initialization power supply line and an anode of the light emitting element LD. A gate electrode of the seventh transistor T7 may be connected to the scan line SLi. The seventh transistor T7 may be turned on when the scan signal is supplied to the scan line SLi to supply the initialization power supply voltage Vint to the anode of the light emitting element LD.

The anode of the light emitting element LD may be connected to the first transistor T1 via the sixth transistor T6, and a cathode thereof may be connected to the second power supply line VSS. The light emitting element LD may emit light of a predetermined luminance corresponding to the current supplied from the first transistor T1. The first power supply voltage VDD may be set to have a higher voltage level than the second power supply voltage VSS, such that current flows through the light emitting element LD.

Figure 3:
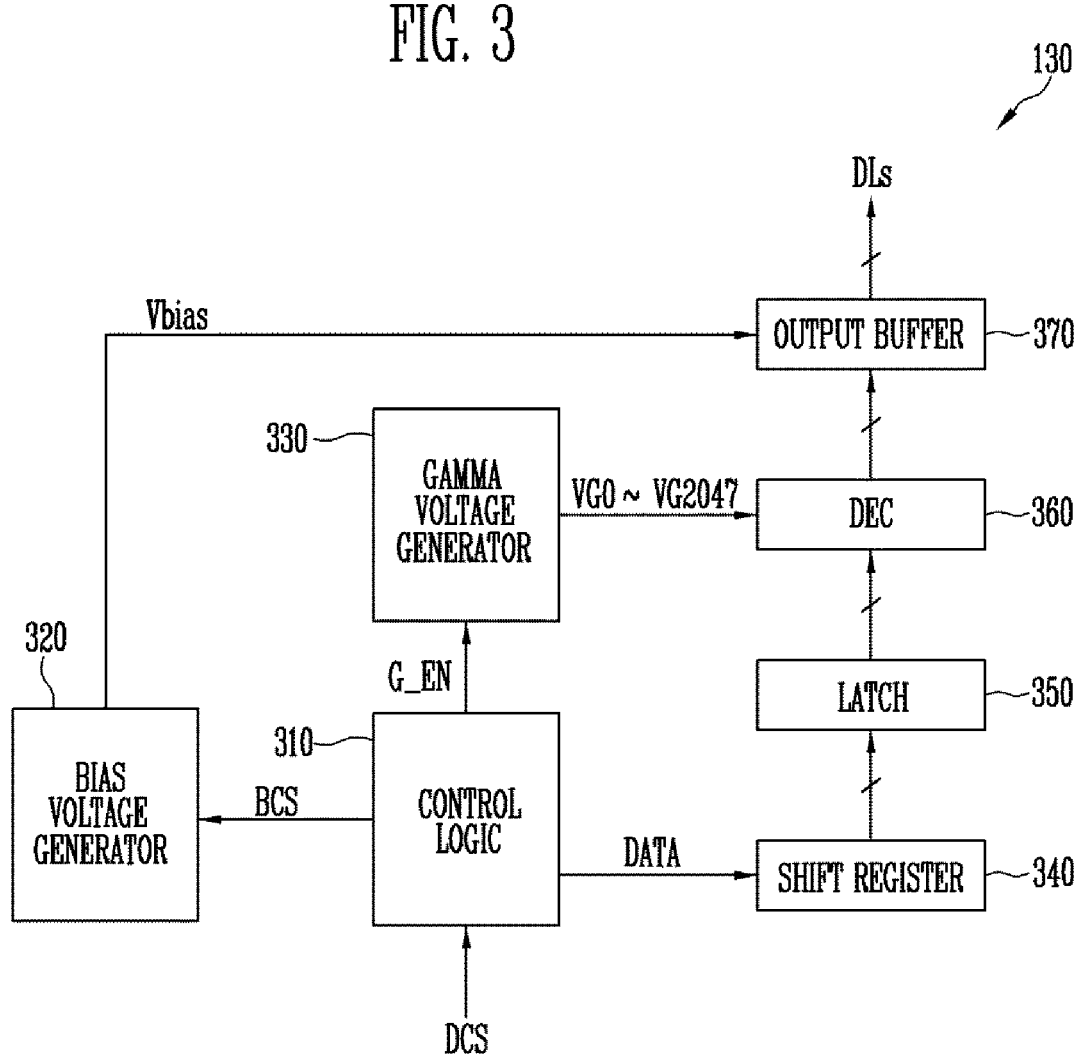
FIG. 3 is an exemplary block diagram of a data driver included in the display device of FIG. 1.

FIG. 3 is an exemplary block diagram of the data driver included in the display device of FIG. 1.

Referring to FIGS. 1 and 3, the data driver 130 (or a source driver) may include a controller 310 (or a control logic), a bias voltage generator 320 (or a bias voltage generating circuit), a gamma voltage generator 330 (or a gamma voltage generating circuit), a shift register 340, a latch 350, a decoder 360 (or a digital-to-analog converter DEC), and an output buffer 370.

The controller 310 may receive the data control signal DCS from the timing controller 140.

The controller 310 may generate a bias control signal BCS based on the data control signal DCS. The bias control signal BCS may be used to adjust a bias voltage Vbias applied to the source buffers (or source amplifiers) configuring an output buffer 370.

As will be described below with reference to FIG. 12, the bias voltage Vbias may be reduced in the porch period (and the black period). In this manner, power consumption of the output buffer 370 and the data driver 130 may be reduced.

The controller 310 may generate a gamma enable signal G_EN. The gamma enable signal G_EN may control the gamma voltage generator 330, such that the gamma voltage generator 330 generates the gamma voltages VG0 to VG2047. The gamma voltages VG0 to VG2047 may be used to convert data DATA (e.g., the image data DATA2 of FIG. 1) into a data voltage (e.g., a gray scale voltage). The gamma voltages VG0 to V2047 may include 2048 gamma voltages corresponding to 11-bit data, but the inventive concepts are not limited thereto.

The controller 310 may convert serialized data received from the timing controller 140 into parallelized data DATA. The controller 310 may provide the parallelized data DATA to the shift register 340.

The bias voltage generator 320 may generate a bias voltage Vbias having various voltage levels in response to the bias control signal BCS.

The gamma voltage generator 330 may receive the gamma enable signal G_EN and generate the gamma voltages VG0 to VG2047 having various voltage levels.

In an exemplary embodiment, the gamma voltage generator 330 may include gamma buffers that transfer representative gamma voltages to a resistor string and a tab of the resistor string, turn on the gamma buffers in the first period, and turn off at least some of the gamma buffers in the second period, such as the gamma buffers that output intermediate gamma voltages corresponding to intermediate gray scales.

In one exemplary embodiment, the gamma voltage generator 330 may turn off at least some of the gamma buffers in the porch period and the black period.

In one exemplary embodiment, the gamma voltage generator 330 may be a digital gamma voltage generator. In this case, the gamma voltages output from the gamma voltage generator 330 may be linear.

The shift register 340 may provide parallelized data DATA to the latch 350. The shift register 340 may generate a latch clock signal and provide the latch signal to the latch 350, and the latch clock signal may be used to control timing at which the parallel data DATA is output.

The latch 350 may latch or temporarily store the data sequentially received from the shift register 340, and transfer the latched data to the decoder 360.

The decoder 360 may convert digital type data (e.g., gray scale value of the parallelized data DATA) into analog type data signal (or data voltage) using the gamma voltages VG0 to VG2047.

The output buffer 370 may receive the data signal and output the data signal to the data lines DLs (e.g., the data lines DL1 to DLm of the display unit 110 described with reference to FIG. 1). The output buffer 370 may include source buffers connected to the data lines DLs.

Figure 4:
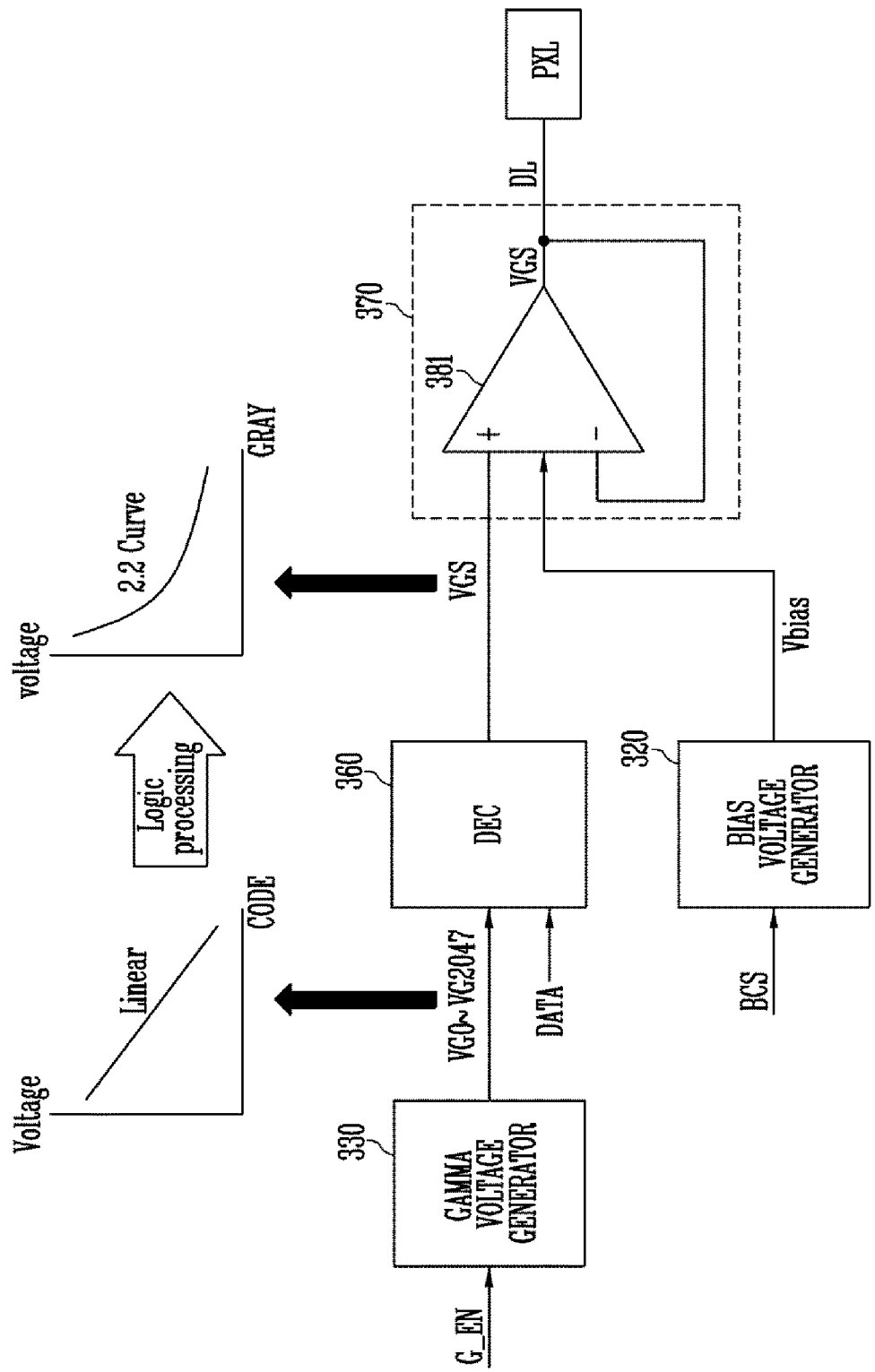
FIG. 4 is an exemplary block diagram of the data driver of FIG. 3.

FIG. 4 is an exemplary block diagram of the data driver of FIG. 3. In FIG. 4 the data driver 130 is schematically illustrated as including the bias voltage generator 320, the gamma voltage generator 330, the decoder 360, and the output buffer 370, which may be used to drive one pixel PXL, however, the data driver 130 may include various other components. Since the bias voltage generator 320, the gamma voltage generator 330, the decoder 360, and the output buffer 370 have been described above with reference to FIG. 3, redundant descriptions thereof will not be repeated.

The gamma voltages VG0 to VG2047 output from the gamma voltage generator 330 may be linear. For example, the gamma voltages VG0 to VG2047 may be located on a straight line corresponding to a linear equation for a gamma code CODE (or a digital input value).

The decoder 360 may select one of the gamma voltages VG0 to VG2047 based on the gray scale value of the data DATA, and output the selected gamma voltage as a data voltage VGS. For example, the decoder 360 may output the data voltage VGS corresponding to a gray scale value by using a separate look-up table, in which relationships between the gray scale value GRAY and the gamma voltages VG0 to VG2047 are defined, or by performing logical processing on the gray scale value. For example, the data voltage VGS may have 265 voltage levels corresponding to 8-bit gray scale value. The data voltage VGS for each gray scale may be located on a gamma curve (for example, a 2.2 gamma curve 2.2 Curve). More particularly, the decoder 360 may output the data voltage VGS corresponding to the 2.2 gamma curve through the logical processing of the linear gamma voltages VG0 to VG2047.

The output buffer 370 may include a source buffer 381 (or a source amplifier). The source buffer 381 may receive the data voltage VGS (or a data signal, a gray scale voltage) from the decoder 360 and may drive the data voltage VGS depending on a level of the bias voltage Vbias. The data voltage VGS that is driven may be output to the pixel PXL via the data line DL. Since a large amount of current may be consumed to drive the pixel PXL, according to an exemplary embodiment, the data voltage VGS may be supplied to the pixel PXL through the source buffer 381.

Figure 5:
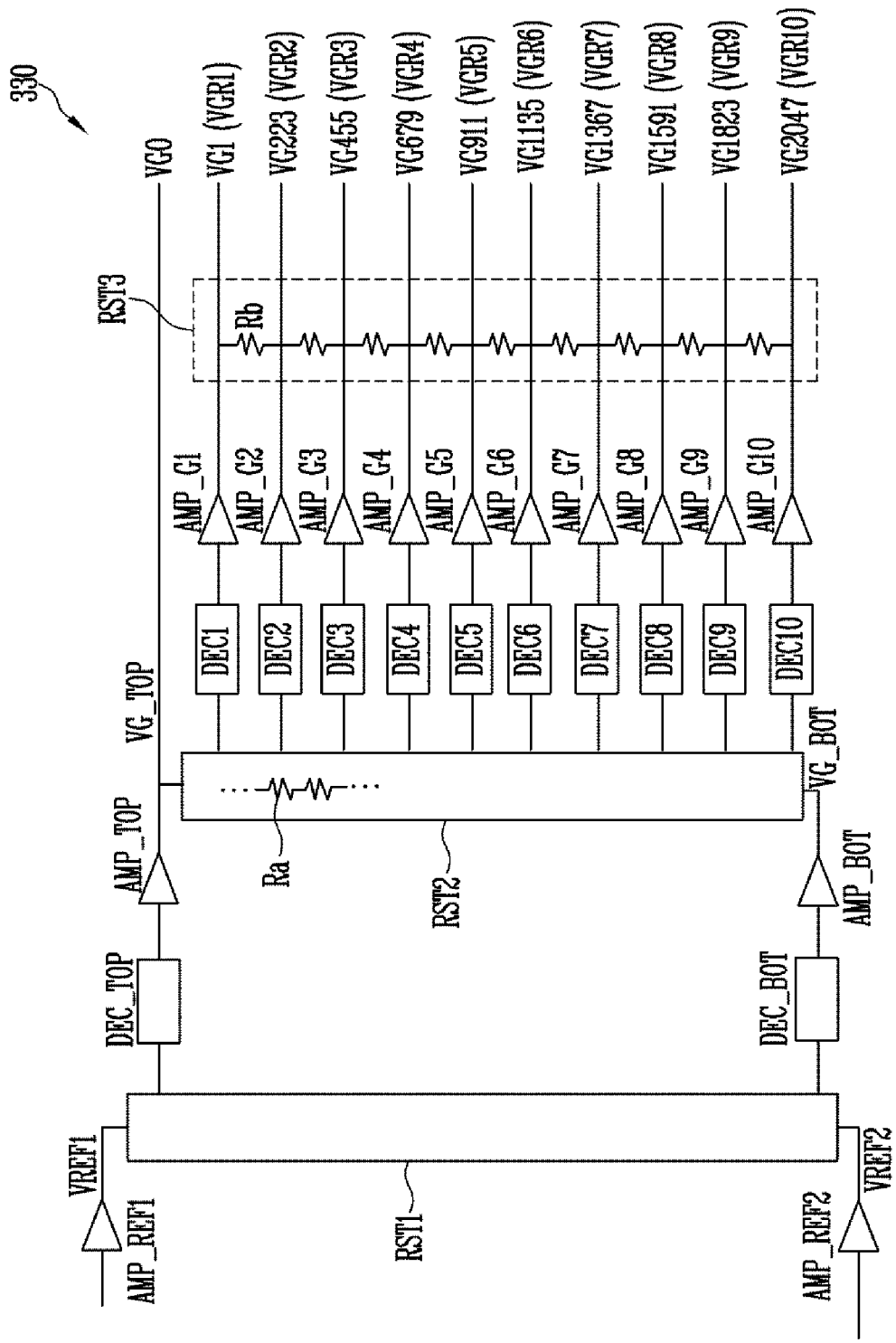
FIG. 5 is an exemplary circuit diagram of a gamma voltage generator included in the data driver of FIG. 3.
Figure 6:
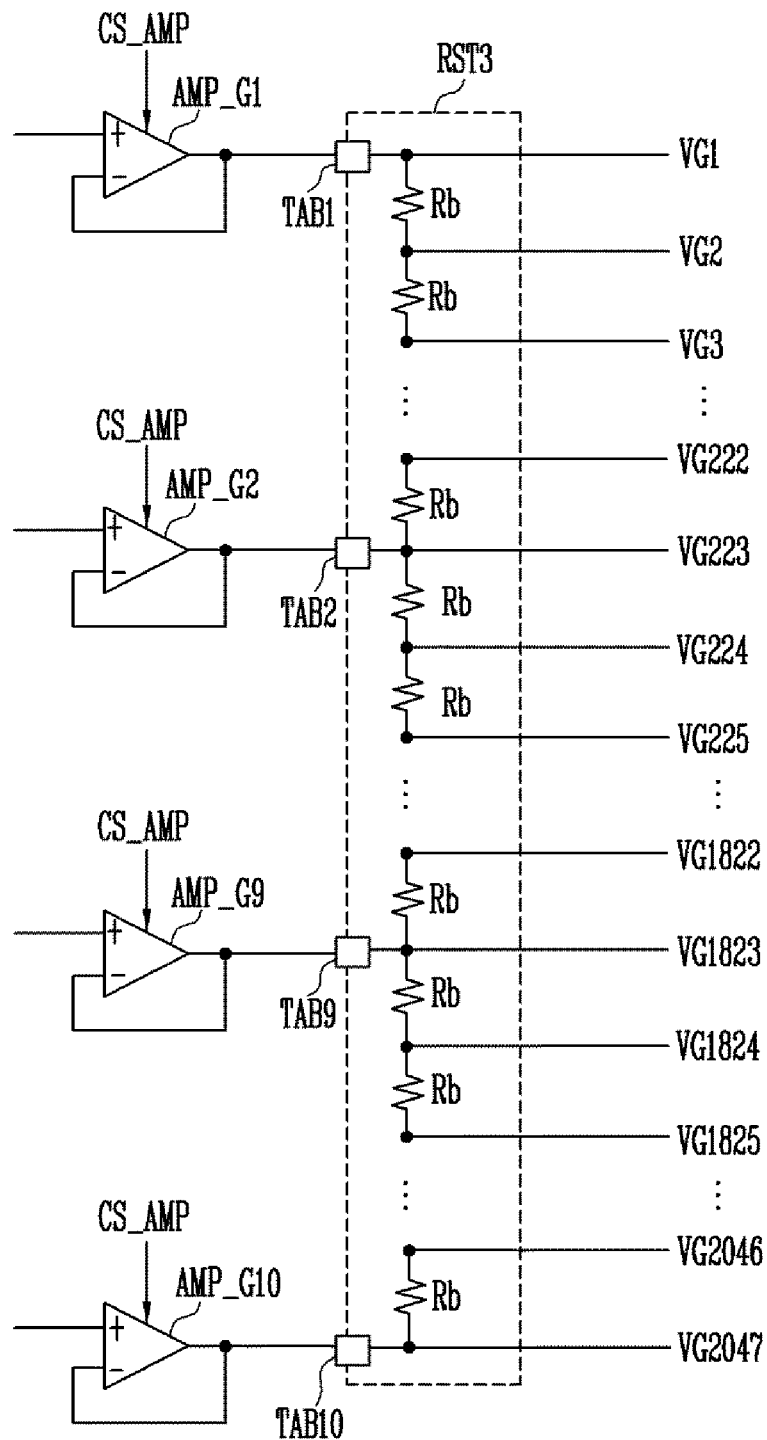
FIG. 6 is an exemplary circuit diagram of gamma buffers connected to a third resistor string included in the gamma voltage generator of FIG. 5.

FIG. 5 is an exemplary circuit diagram of the gamma voltage generator included in the data driver of FIG. 3. FIG. 6 is an exemplary circuit diagram of the gamma buffers connected to a third resistor string included in the gamma voltage generator of FIG. 5.

Referring to FIGS. 3 to 5, the gamma voltage generator 330 may include a first resistor string RST1, a second resistor string RST2, a third resistor string RST3, a first reference selector DEC_TOP, a second reference selector DEC_BOT, selectors DEC1 to DEC10, a first reference buffer AMP_REF1, a second reference buffer AMP_REF2, a first buffer AMP_TOP, a second buffer AMP_BOT, and first to tenth gamma buffers AMP_G1 to AMP_G10 (or first to tenth gamma amplifiers). Although ten gamma buffers (AMP_G1 to AMP_G10) are illustrated in FIG. 5, however, the inventive concepts are not limited to a particular number of gamma buffers.

The first reference buffer AMP_REF1 may output a first reference voltage VREF1, and the second reference buffer AMP_REF2 may output a second reference voltage VREF2. The first reference voltage VREF1 is a minimum voltage that the gamma voltages VG0 to VG2047 may have, and the second reference voltage VREF2 is a maximum voltage that the gamma voltages VG0 to VG2047 may have. Each of the first and second reference voltages VREF1 and VREF2 may be set based on a drive voltage (or a power supply voltage) applied to the gamma voltage generating circuit, for example. For example, each of the first and second reference voltages VREF1 and VREF2 may be selected from a voltage obtained by dividing the drive voltage applied to the gamma voltage generating circuit, and may be supplied to the first and second reference buffers AMP_REF1 and AMP_REF2, respectively.

The first resistor string RST1 may include a plurality of resistors, and a voltage between the first and second reference voltages VREF1 and VREF2 may be divided by the resistors.

The first reference selector DEC_TOP may select one of the voltages divided by the first resistor string RST1, and output the selected voltage among the divided voltages as a maximum gamma voltage VG_TOP. The maximum gamma voltage VG_TOP may be set to a gamma voltage (for example, the reference gamma voltage VG0 corresponding to a minimum gray scale) having the highest voltage level among the gamma voltages VG0 to VG2047.

Similarly, the second reference selector DEC_BOT may select the other one of the voltages divided by the first resistor string RST1, and output the selected voltage among the divided voltages as a minimum gamma voltage VG_BOT. The minimum gamma voltage VG_BOT may define a minimum value of a range of the gamma voltages VG0 to VG2047.

Each of the first and second reference selectors DEC_TOP and DEC_BOT may be implemented as a 12-bit decoder, however, the inventive concepts are not limited thereto.

The second resistor string RST2 may include a plurality of first resistors Ra and set a range of the gamma voltages VG0 to VG2047. The maximum gamma voltage VG_TOP may be provided at one end (for example, an upper tab) of the second resistor string RST2, the minimum gamma voltage VG_BOT may be provided at the other end (for example, a lower tab) of the second resistor string RST2, and voltages between the maximum gamma voltage VG_TOP and the minimum gamma voltage VG_BOT may be divided through the first resistors Ra. The first resistors Ra may have the same resistance value.

The first selector DEC1 may select one of the voltages divided by the second resistor string RST2, and the first gamma buffer AMP_G1 may output the selected voltage among the voltages divided by the second resistor string RST2, and the selected voltage among the divided voltages may be set as a lowest gray scale gamma voltage (a first gamma voltage VG1, a first representative gamma voltage VGR1, or a first tab gamma voltage).

Similarly, each of the second to tenth selectors DEC2 to DEC10 may select one of the voltages divided by the second resistor string RST2, and the second to tenth gamma buffers AMP_G2 to AMP_G10 may output the voltages selected by the second to tenth selectors DEC2 to DEC10, respectively. The voltage selected by the tenth selector DEC10 and output through the tenth gamma buffer AMP_G10 may be set as the highest gray scale gamma voltage VG2047 (a tenth representative gamma voltage VGR10, or a tenth tab gamma voltage), and the voltages output through the second to ninth gamma buffers AMP_G2 to AMP_G9) may be set as the intermediate gray scale gamma voltages VG223, VG455, VG679, VG911, VG1135, VG1367, VG1591, and VG1823 (second to ninth representative gamma voltages VGR2 to VGR9, second to ninth tab gamma voltages, or intermediate gray scale tab gamma voltages), for example.

Each of the first to tenth selectors DEC1 to DEC10 may be implemented a 13-bit decoder, but the inventive concepts are not limited thereto.

The gamma voltages VG1, VG223, VG455, VG679, VG911, VG1135, VG1367, VG1591, VG1823, and VG2047 (or tab gamma voltages) output through the first to tenth gamma buffers AMP_G1 to AMP_G10 may be set with mutually equal intervals.

The third resistor string RST3 may include a plurality of second resistors Rb and generate the gamma voltages VG1 to VG2047 within a gamma voltage range set in the second resistor string RST2. The second resistors Rb may have the same resistance value.

As illustrated in FIG. 6, the first to tenth gamma buffers AMP_G1 through AMP_G10 may be connected to specific tabs (or specific tab points) of the third resistor string RST3 to reduce an RC delay of the gamma voltages VG1, VG223, VG455, VG679, VG911, VG1135, VG1367, VG1591, VG1823, and VG2047, and to reduce setting times of the gamma voltages VG1, VG223, VG455, VG679, VG911, VG1135, VG1367, VG1591, VG1823, and VG2047. More particularly, the first to tenth gamma buffers AMP_G1 to AMP_G10 may rapidly charge the gamma voltages VG1, VG223, VG455, VG679, VG911, VG1135, VG1367, VG1591, VG1823, and VG2047 to a target gamma voltage, and thus, it is possible to improve linearity of the gamma voltages and to facilitate the control of the gamma voltages.

According to an exemplary embodiment, the second buffer AMP_BOT may vary the minimum gamma voltage VG_BOT in response to a luminance control signal LCS. The luminance control signal LCS may be provided from the outside, such as from the timing controller 140. More particularly, the second buffer AMP_BOT may vary the minimum gamma voltage VG_BOT according to a display luminance of the display device 100, and thus, a range of the gamma voltages VO to V2047 may be adjusted.

However, in this case, non-linear characteristics may be generated in the gamma voltages due to offsets of the first to tenth gamma buffers AMP_G1 to AMP_G10. That is, analog output may have non-linear characteristics as compared to digital input value CODE.

Meanwhile, at least some of the first to tenth gamma buffers AMP_G1 to AMP_G10 may be turned on or off by a gamma buffer control signal CS_AMP (or a gamma enable signal G_EN (see FIG. 3)). Turn-on and turn-off operations of the first to tenth gamma buffers AMP_G1 to AMP_G10 will be described in more detail below with reference to FIG. 8.

Figure 7:
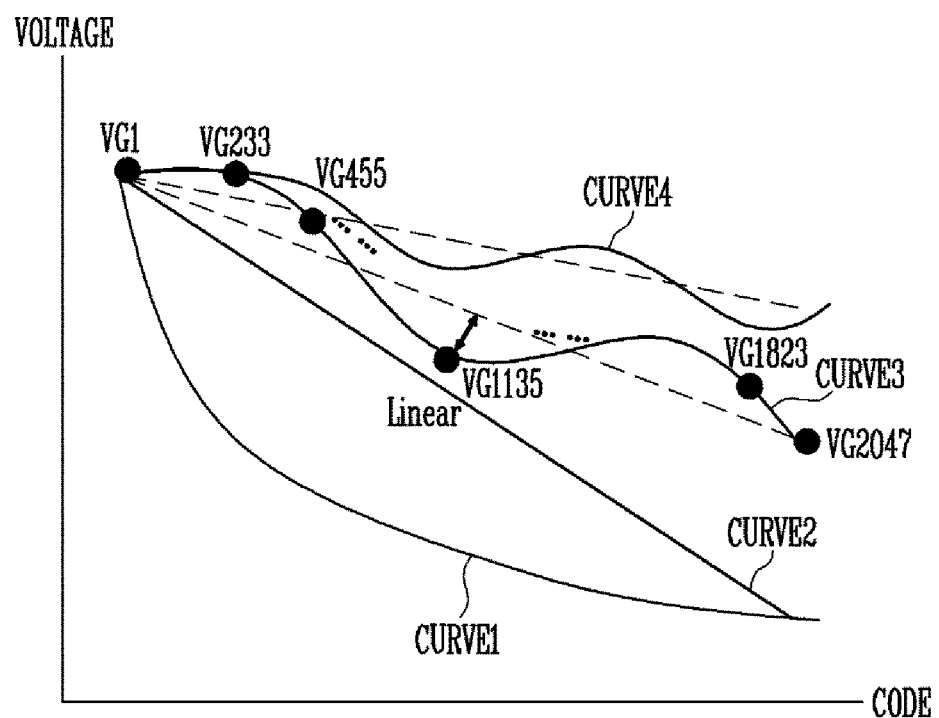
FIG. 7 is an exemplary diagram of gamma voltages output from the gamma voltage generator of FIG. 5.

FIG. 7 is an exemplary diagram illustrating the gamma voltages output from the gamma voltage generator of FIG. 5.

Referring to FIGS. 5 to 7, a first curve CURVE1 indicates the gamma voltages output through the third resistor string RST3 in correspondence with a first luminance, when only the first and tenth gamma buffers AMP_G1 and AMP_G10 are operating or are turned on (e.g., the second to ninth buffers AMP_G2 to AMP_G9 are not being operated or are turned off). A second curve CURVE2 indicates the gamma voltages output through the third resistor string RST3 in correspondence with the first luminance, when the first to tenth gamma buffers AMP_G1 to AMP_G10 are operated. A third curve CURVE3 and a fourth curve CURVE4 indicate the gamma voltages output through the third resistor string RST3 in correspondence with a second luminance and a third luminance, respectively, when the first to tenth gamma buffers AMP_G1 to AMP_G10 are operated.

Referring to the first curve CURVE1, when only the first and tenth gamma buffers AMP_G1 and AMP_G10 are operated, while the second to ninth buffers AMP_G2 to AMP_G9 do not operate or are turned off, the tab gamma voltages (in particular, intermediate gamma voltages) may not reach target gamma voltages (e.g., gamma voltages on the second curve CURVE2) within a certain time due to the RC delay and exhibit nonlinear characteristics as shown in FIG. 7.

Referring to the second curve CURVE2, when all of the first to tenth gamma buffers AMP_G1 to AMP_G10 are operated, the RC delays of the gamma voltages are reduced by the first to tenth gamma buffers AMP_G1 to AMP_G10, and thus, the gamma voltages may reach the target gamma voltages within a certain time and have linear characteristics.

Referring to the third curve CURVE3, when a display luminance of the display device 100 is changed from the first luminance to the second luminance, the minimum gamma voltage VG_BOT described above with reference to FIG. 5 may be changed, and thus, the first to tenth gamma buffers AMP_G1 to AMP_G10 may output the tab gamma voltages corresponding to the second luminance. However, while an offset of each of the first to tenth gamma buffers AMP_G1 to AMP_G10 is changed according to a change of the minimum gamma voltage VG_BOT, the gamma voltages VG1, VG233, VG455, VG1135, VG1823, and VG2047 may have an error based on the target gamma voltages (for example, a dashed line intersecting the third curve CURVE3), and may have nonlinear characteristic as a whole. Accordingly, the display device 100 does not accurately display a desirable image, and display quality thereof may be degraded.

While the setting of the first to tenth gamma buffers AMP_G1 to AMP_G10 may be changed or control values of the first to tenth selectors DEC1 to DEC10 may be changed, in accordance to the second luminance, however, when the control values of the first to tenth selectors DEC1 to DEC10 are required to be set for all modifiable luminance, associated costs may be increased.

Similarly to the third curve CURVE3, when the display luminance of the display device 100 is changed to the third luminance, the gamma voltages according to the fourth curve CURVE4 have nonlinear characteristics.

Accordingly, the gamma voltage generator 330 according to an exemplary embodiment may rapidly charge the gamma voltages to the vicinity of the target gamma voltages by turning on the gamma buffers in the first period (for example, a period prior to generating a data voltage), and may remove errors of the gamma voltages by turning off at least some (for example, at least one of the second to ninth gamma buffers AMP_G2 to AMP_G9) of the gamma buffers in the second period (for example, a period in which the data voltage is generated). For example, when the first and tenth gamma buffers AMP_G1 and AMP_G10 maintain a turn-on state in the second period to prevent the change in the maximum gamma voltage and the minimum gamma voltage, the second to ninth gamma buffers AMP_G2 to AMP_G9 are turned off. As such, the gamma tab points may be in a floating state (e.g., a state when a voltage of a corresponding point is changeable), and each of the gamma voltages may be adjusted by the third resistor string RST3. In this manner, error components of the gamma voltages in the first period may be removed.

Figure 8A:
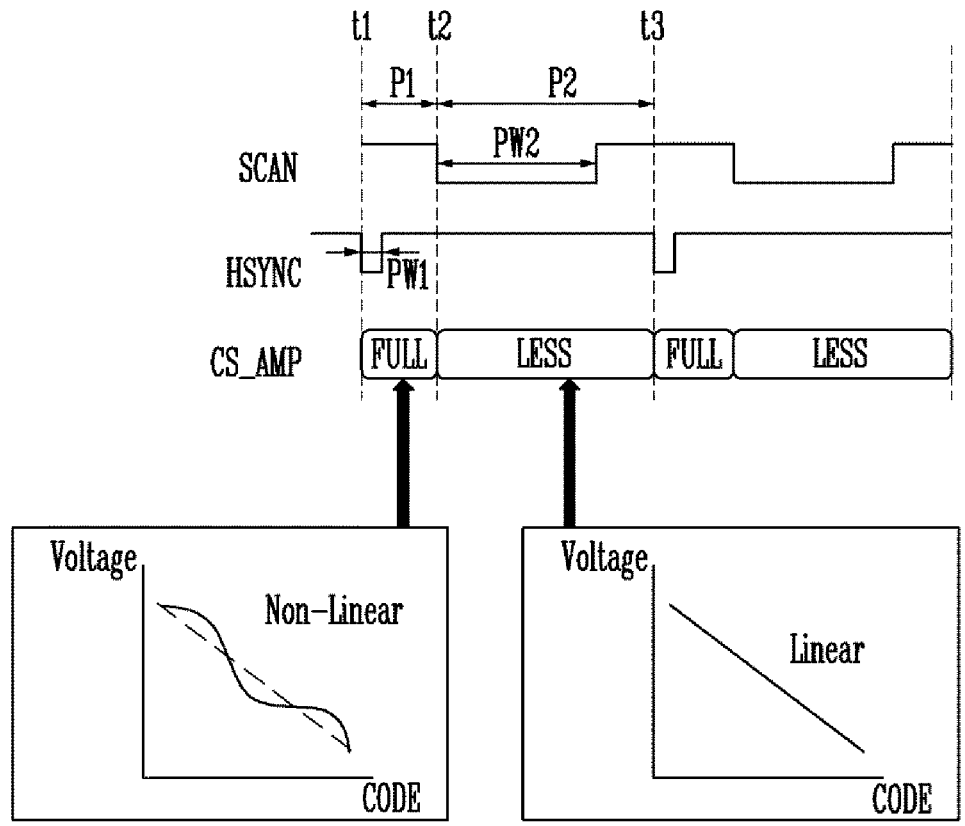
FIGS. 8A and 8B are waveform diagrams illustrating an operation of the gamma voltage generator of FIG. 5.
Figure 8B:
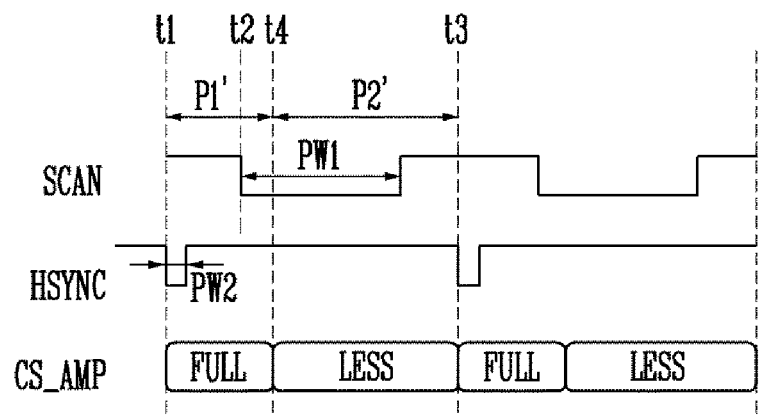
Figure 9:
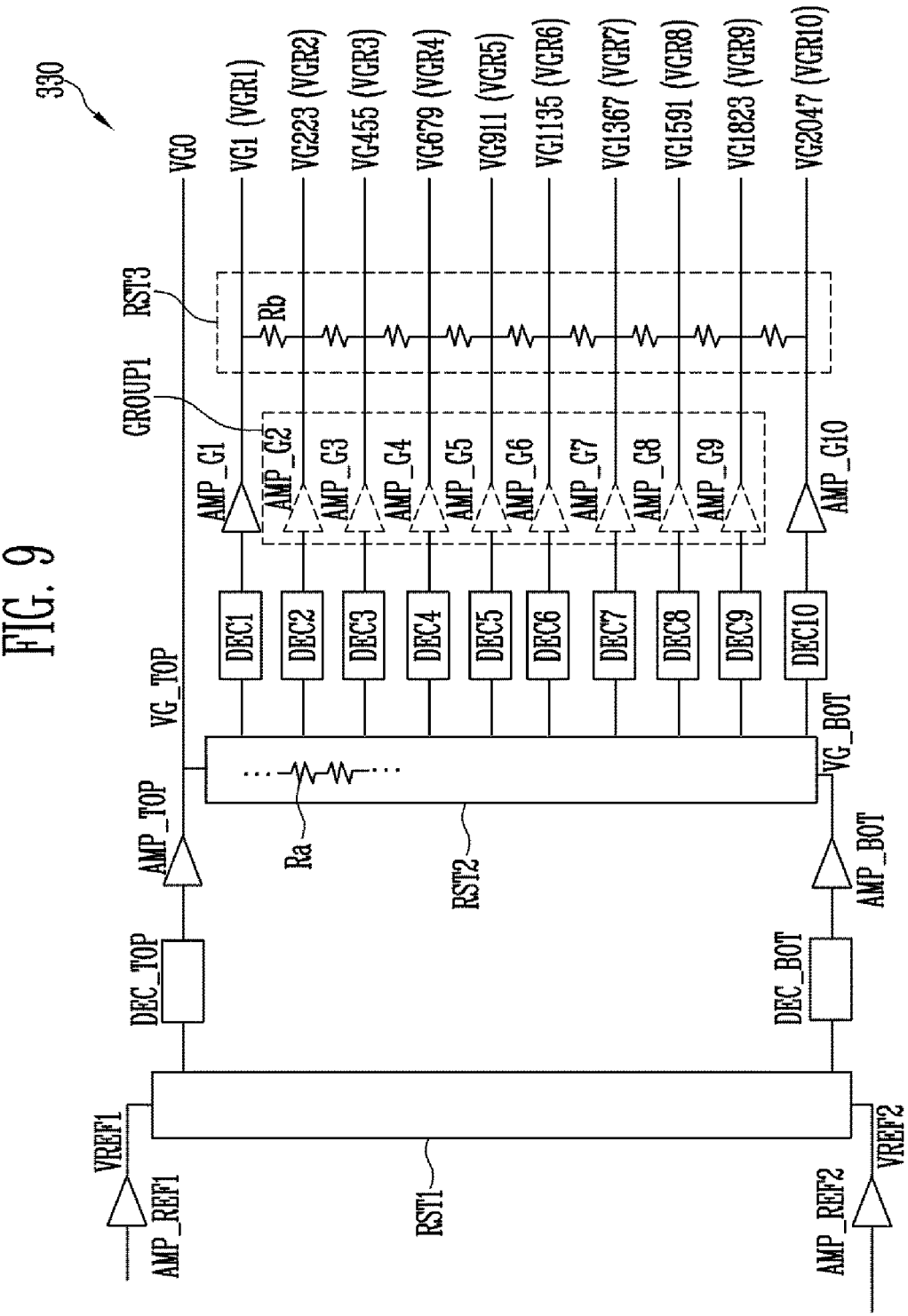
FIG. 9 is an exemplary circuit diagram illustrating an operation of the gamma voltage generator of FIG. 5.

FIGS. 8A and 8B are waveform diagrams illustrating an operation of the gamma voltage generator of FIG. 5. FIGS. 8A and 8B illustrate the scan signal SCAN, the horizontal synchronization signal HSYNC, and a gamma buffer control signal CS_AMP for controlling operations of the gamma buffers AMP_G1 to AMP_G10 described above with reference to FIG. 1. The gamma buffer control signal CS_AMP may be included in the gamma enable signal G_EN described above with reference to FIG. 3, or may be provided to the gamma voltage generator 330 from the controller 310 together with the gamma enable signal G_EN. FIG. 9 is an exemplary circuit diagram illustrating the operation of the gamma voltage generator of FIG. 5. FIG. 9 illustrates an operation of the gamma voltage generator 330 in the first period described in FIGS. 8A and 8B.

First, referring to FIGS. 1, 5, and 8A, the scan signal SCAN may have a turn-off voltage level (or a logic high level) at a first point of time t1. Accordingly, the data signal may not be provided to the pixel PXL.

The horizontal synchronization signal HSYNC may be shifted from a turn-off voltage level to a turn-on voltage level (for example, a logic low level), and may be maintained at the turn-on voltage level for a certain period of time. More particularly, the horizontal synchronization signal HSYNC has a first pulse of the turn-on voltage level at the first point of time t1, and for example, the first pulse may have a first pulse width PW1.

The gamma buffer control signal CS_AMP may have a first value, for example, FULL (or a first state). The gamma buffer control signal CS_AMP may have the first value in response to the horizontal synchronization signal HSYNC of the turn-on voltage level, and for example, and the controller 310 described above with reference to FIG. 3 may generate the gamma buffer control signal CS_AMP based on the horizontal synchronization signal HSYNC.

In this case, each of the first to tenth gamma buffers AMP_G1 to AMP_G10 may be turned on in response to the gamma buffer control signal CS_AMP having the first value or maintain the turn-on state. As illustrated by the third curve CURVE3 (or the fourth curve CURVE4) described above with reference to FIG. 7, the gamma voltages may be rapidly charged to voltages close to the target gamma voltages, and the gamma voltages may have errors due to the offsets of the gamma buffers AMP_G1 to AMP_G10 or may exhibit nonlinear characteristics.

Thereafter, at a second point of time t2, the gamma buffer control signal CS_AMP may be changed to have a second value, for example, LESS (or a second state) from the first value. In this case, at least some of the first to tenth gamma buffers AMP_G1 to AMP_G10 may be turned off in response to the gamma buffer control signal CS_AMP having the second value.

For example, as illustrated in FIG. 9, the second to ninth gamma buffers AMP_G2 to AMP_G9 included in a first group GROUP1 may be turned off. Meanwhile, the first and tenth gamma buffers AMP_G1 and AMP_G10 may maintain the turn-on state.

In this case, the maximum gamma voltage and the minimum gamma voltage among the gamma voltages are maintained at fixed voltage levels according to outputs of the first and tenth gamma buffers AMP_G1 and AMP_G10, and intermediate gamma voltages, for example, gamma voltages corresponding to the second to ninth gamma buffers AMP_G2 to AMP_G9, may be free from the outputs of the second to ninth gamma buffers AMP_G2 to AMP_G9. Accordingly, the intermediate gamma voltages are adjusted by the third resistor string RST3, and error components due to offsets of the gamma buffers AMP_G1 to AMP_G10 may be removed. In this manner, the intermediate gamma voltages may have linear characteristics.

Meanwhile, the scan signal SCAN may have a turn-on voltage level at the second point of time t2. For example, the scan signal SCAN may have a pulse having the turn-on voltage level during a second pulse width PW2. The data driver 130 may generate a data signal using the gamma voltages (e.g., the gamma voltages having the linear characteristics at the second point of time t2) in correspondence with the scan signal SCAN, and the pixel PXL described above with reference to FIG. 1 may emit light with a luminance corresponding to the data signal, more particularly, the data voltage having a more accurate voltage level in response to the scan signal SCAN.

Meanwhile, the scan signal SCAN, the horizontal synchronization signal HSYNC, and the gamma buffer control signal CS_AMP at the third point of time t3 may be substantially the same as the scan signal SCAN, the horizontal synchronization signal HSYNC, and the gamma buffer control signal CS_AMP at the first point of time t1. More particularly, the scan signal SCAN, the horizontal synchronization signal HSYNC, and the gamma buffer control signal CS_AMP may have a cycle between the first point of time t1 and the third point of time t3.

As described with reference to FIGS. 8A and 9, in the first period P1 (or a period in which the horizontal synchronization signal HSYNC has the turn-on voltage level) in which the scan signal SCAN has the turn-off voltage level, each of the gamma buffers AMP_G1 to AMP_G10 may be turned on, and in the second period P2 (or a period in which the horizontal synchronization signal HSYNC has the turn-off voltage level) in which the scan signal SCAN has the turn-on voltage level, at least some of the buffers AMP_G1 through AMP_G10 (e.g., the second to ninth gamma buffers AMP_G2 through AMP_G9) may be turned off. Accordingly, the gamma voltages may be more easily controlled, and linear characteristics of the gamma voltages may be ensured.

Although it is described with reference to FIG. 8A that at least some of the gamma buffers AMP_G1 to AMP_G10 are turned off at the second point of time t2, which may be a point of time when the scan signal SCAN is shifted from the turn-off voltage level to the turn-on voltage level, the inventive concepts are not limited thereto. For example, as illustrated in FIG. 8B, at least some of the gamma buffers AMP_G1 to AMP_G10 may be turned off at the third point of time t3, and the third point of time t3 may be a point of time after the second point of time t2, which may be a point of time when the scan signal SCAN is shifted from the turn-off voltage level to the turn-on voltage level. In this case, a delay may occur even when the data voltage is recorded in the pixel PXL (see FIG. 4), and in consideration of this, a first period P1' may partially overlap the period in which the scan signal SCAN has the turn-on voltage.

As described above with reference to FIGS. 8A to 9, in the first period P1 (or the period in which the horizontal synchronization signal HSYNC has the turn-on voltage level) in which the scan signal SCAN has the turn-off voltage level, each of the gamma buffers AMP_G1 to AMP_G10 may be turned on, and in the second period P2 (or the period in which the horizontal synchronization signal HSYNC has the turn-off voltage level) in which the scan signal SCAN has the turn-on voltage level, at least some of the buffers AMP_G1 through AMP_G10 (for example, the second to ninth gamma buffers AMP_G2 through AMP_G9) may be turned off. Accordingly, the gamma voltages may be more easily controlled, and linear characteristics of the gamma voltages may be ensured.

Figure 10:
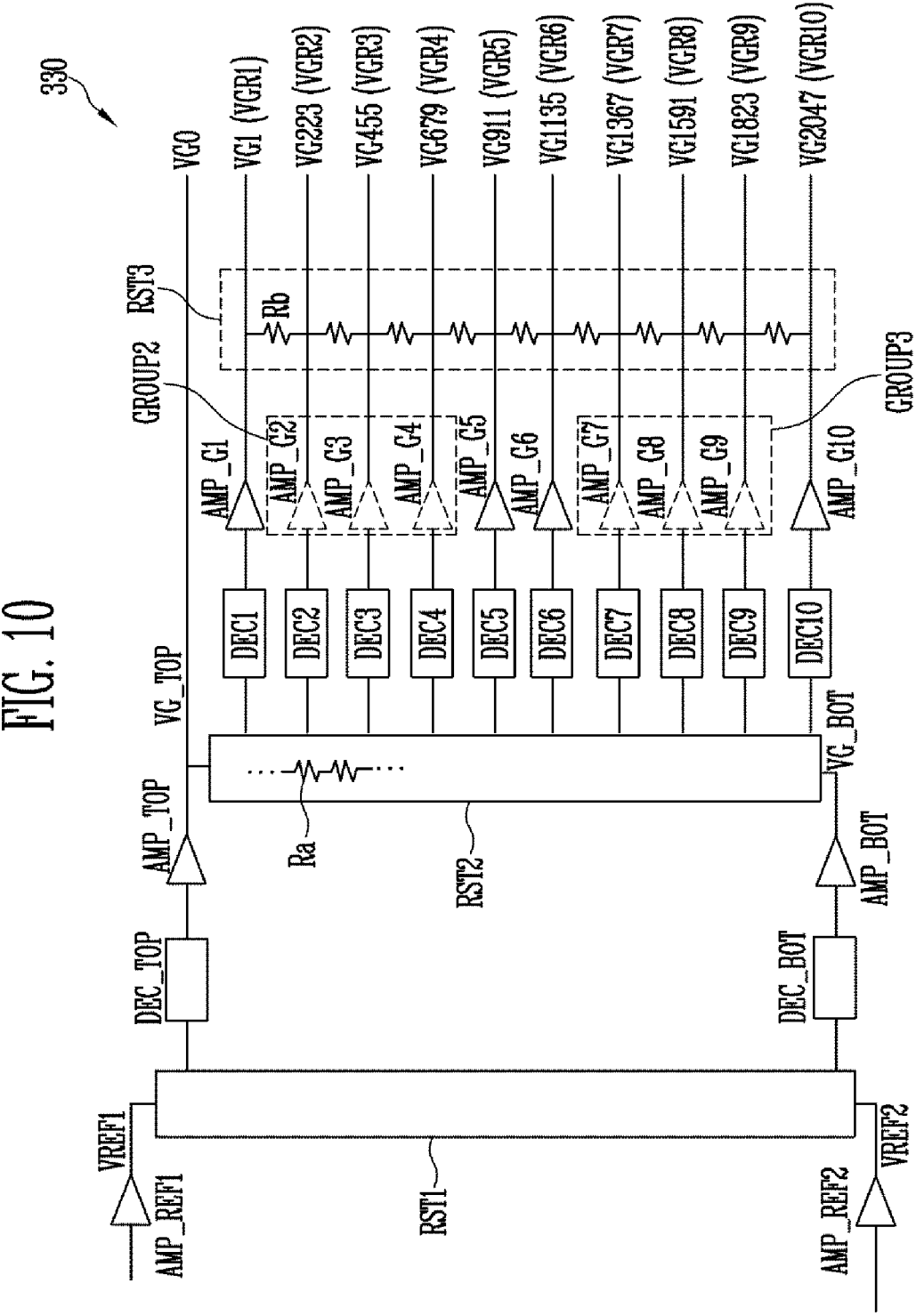
FIG. 10 is another exemplary circuit diagram illustrating an operation of the gamma voltage generator of FIG. 5.
Figure 11:
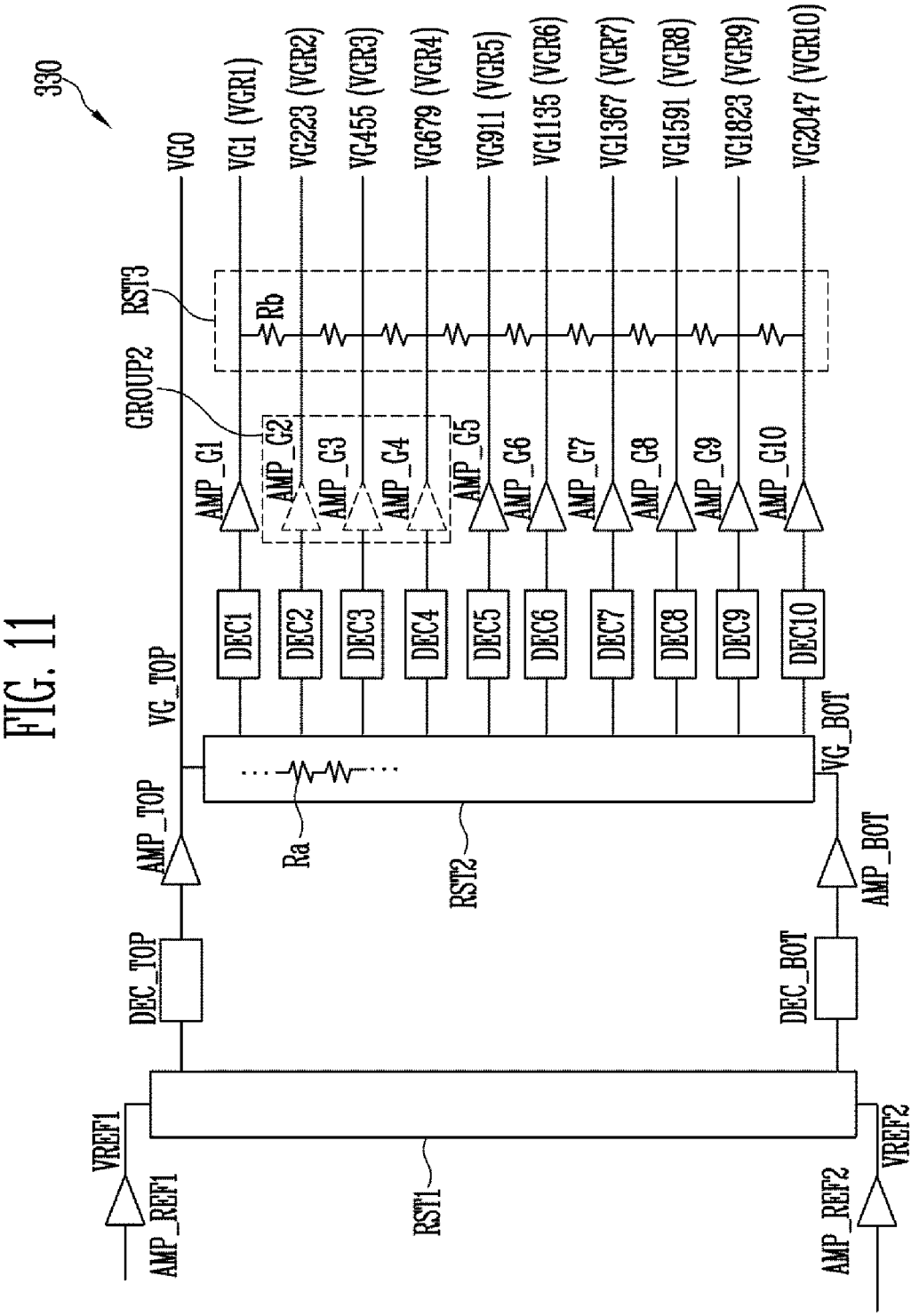
FIG. 11 is still another exemplary circuit diagram illustrating an operation of the gamma voltage generator of FIG. 5.

FIG. 10 is another exemplary circuit diagram illustrating the operation of the gamma voltage generator of FIG. 5. FIG. 11 is still another exemplary circuit diagram illustrating the operation of the gamma voltage generator of FIG. 5. FIGS. 10 and 11 exemplarily illustrate the operation of the gamma voltage generator 330 in the second period P2 illustrated in FIG. 8.

Referring to FIGS. 8A and 10, in the second period P2, the first and tenth gamma buffers AMP_G1 and AMP_G10 corresponding to the maximum gamma voltage and the minimum gamma voltage among the first to tenth gamma buffers AMP_G1 to AMP_G10 may maintain the turn-on state. In addition, the gamma buffer (or a gamma buffer most distant from the first and tenth gamma buffers AMP_G1 and AMP_G10) closest to an average of the maximum gamma voltage and the minimum gamma voltage may maintain the turn-on state. For example, as illustrated in FIG. 10, the fifth gamma buffer AMP_G5 and the sixth gamma buffer AMP_G6 may maintain the turn-on state. An average of the first gamma voltage VG1 and the 2047th gamma voltage VG2047 may be the 1024th gamma voltage, and the 1135th gamma voltage (and/or the 911th gamma voltage) may be the closest to the 1024th gamma voltage. Accordingly, the fifth gamma buffer AMP_G5 and the sixth gamma buffer AMP_G6 may maintain the turn-on state. Meanwhile, the second to fourth gamma buffers AMP_G2 to AMP_G4 included in a second group GROUP2, and the seventh to ninth gamma buffers AMP_G7 to AMP_G9 included in a third group GROUP3) may be turned off.

In general, the possibility that a gamma voltage deviates from the target gamma voltage increases as being further away from the maximum gamma voltage and the minimum gamma voltage. Accordingly, the intermediate voltage farthest from the maximum gamma voltage and the minimum gamma voltage may be fixed by the gamma buffer.

Although the second to fourth gamma buffers AMP_G2 to AMP_G4 and seventh to ninth gamma buffers AMP_G7 to AMP_G9 in FIG. 10 are illustrated as being turned off, the inventive concepts are not limited thereto. For example, at least one of the third and eighth gamma buffers AMP_G3 and AMP_G8 may maintain the turn-on state.

Referring to FIGS. 8 and 11, only the gamma buffers corresponding to the specific gray scale area may be turned off in the second period P2. For example, as illustrated in FIG. 11, the second to fourth gamma buffers AMP_G2 to AMP_G4 included in the second group GROUP2 that correspond to the low gray scale area are turned off, and the first and fifth to tenth gamma buffers AMP_G1, and AMP_G5 to AMP_G10 may maintain the turn-on state.

More particularly, only the gamma buffers corresponding to the gray scale area that have the gamma voltage distorted by the offset or the like to be visibly recognized by a user may be turned off.

Although the second to fourth gamma buffers AMP_G2 to AMP_G4 in FIG. 11 are illustrated as being turned off, however, the inventive concepts are not limited thereto. For example, at least one of the sixth to ninth gamma buffers AMP_G6 to AMP_G9 may be turned on.

Figure 12:
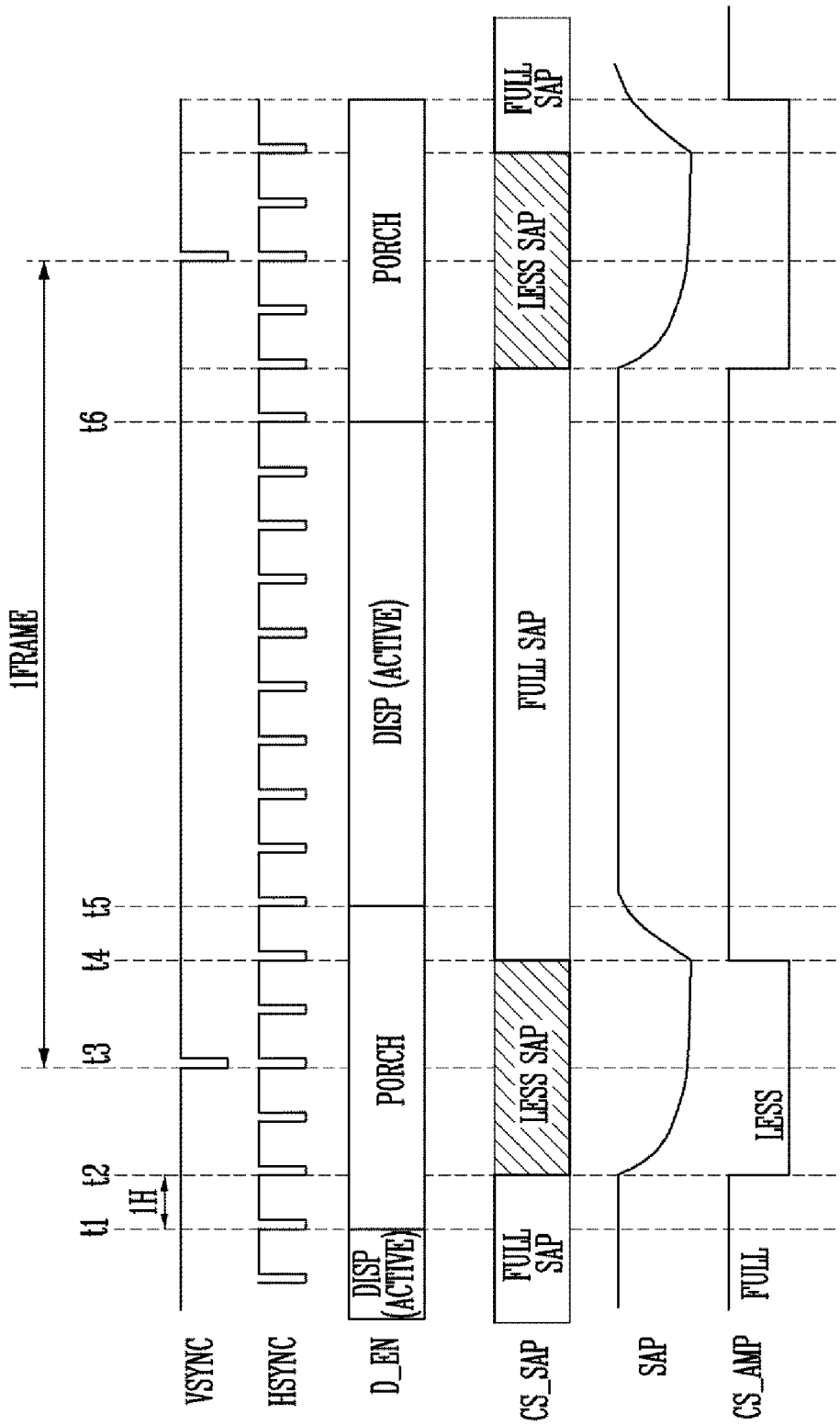
FIG. 12 is an exemplary waveform diagram illustrating an operation of the data driver of FIG. 3.

FIG. 12 is an exemplary waveform diagram illustrating an operation of the data driver of FIG. 3. FIG. 12 illustrates the vertical synchronization signal VSYNC, the horizontal synchronization signal HSYNC, the data enable signal D_EN, which are described above with reference to FIG. 1, a source buffer control signal CS_SAP (or the bias voltage Vbias described above with reference to FIG. 3), power consumption SAP of the source buffer 381 (see FIG. 4), and the gamma buffer control signal CS_AMP, which is described above with reference to FIG. 8A. As described above with reference to FIG. 1, the vertical synchronization signal VSYNC defines a frame period in which a frame image is displayed, and the horizontal synchronization signal HSYNC defines a horizontal period in which the data driver 130 outputs a data signal. The data enable signal D_EN may define a display period DISP (or a valid period ACTIVE during which a valid data signal is provided) and a porch period PORCH (or a blank period). The display period DISP may be a period during which an image corresponding to frame data may be displayed, and the porch period PORCH may be a period between an end point of time and a start point of time of the display period DISP.

Referring to FIGS. 1, 3, 4, 5, and 12, the horizontal synchronization signal HSYNC may be a pulse signal having a periodic logic low level. A cycle of the horizontal synchronization signal HSYNC may be defined as one horizontal time 1H.

At the first point of time t1, the display period DISP may end according to the data enable signal D_EN, and the porch period PORCH may start. For example, the data enable signal D_EN may have a logic low level in the display period DISP and have a logic high level in the porch period PORCH.

At the second point of time t2, the source buffer control signal CS_SAP may change from a first state value FULL SAP to the second state value LESS SAP. When the source buffer control signal CS_SAP has the first state value FULL SAP, a full buffer voltage may be applied to the source buffer 381, and when the source buffer control signal CS_SAP has the second state value LESS SAP, a relatively low bias voltage may be applied to the source buffer 381. That is, the source buffer 381 that boosts the data voltage may not require a large power consumption in the PCRCH period.

The source buffer control signal CS_SAP may be changed based on the data enable signal D_EN. For example, a state value of the source buffer control signal CS_SAP may be changed after a first horizontal time 1H when a value of the data enable signal D_EN changes from a logic low level to a logic high level.

The power consumption SAP of the source buffer 381 may be reduced in response to a second state value LESS SAP of the source buffer control signal CS_SAP.

The gamma buffer control signal CS_AMP may be changed to have a second value LESS from the first value FULL. As described above with reference to FIG. 8, when the gamma buffer control signal CS_AMP has the first value FULL, each of the gamma buffers AMP_G1 to AMP_G10 may be turned on or maintain the turn-on state, and when the gamma buffer control signal CS_AMP has the second value LESS, at least some of the gamma buffers AMP_G1 to AMP_G10 may be turned off. For example, each of the gamma buffers AMP_G1 through AMP_G10 may be turned off.

Since no valid data signal is generated in the porch period PCRCH, at least some of the gamma buffers AMP_G1 to AMP_G10 may be turned off. Accordingly, power consumption may be reduced.

At the third point of time t3, the vertical synchronization signal VSYNC may be shifted from a logic high level to a logic low level.

Thereafter, at the fourth point of time t4, the source buffer control signal CS_SAP may be changed to have the first state value FULL SAP from the second state value LESS SAP. For example, the source buffer control signal CS_SAP may be changed to have the first state value FULL SAP from the second state value LESS SAP in response to the vertical synchronization signal VSYNC.

The power consumption SAP of the source buffer 381 may be increased in response to the first state value FULL SAP of the source buffer control signal CS_SAP.

In addition, the gamma buffer control signal CS_AMP may be changed to have the first value FULL from the second value LESS. Each of the gamma buffers AMP_G1 through AMP_G10 may be turned on in response to the first value FULL of the gamma buffer control signal CS_AMP.

That is, at the fourth point of time t4, the gamma buffers AMP_G1 to AMP_G10 and the source buffer 381 may prepare generation (or generation of the gamma voltage used for generating the data signal) and output of a valid data signal.

Thereafter, at the fifth point of time t5, the porch period PORCH may end and the display period DISP may start in response to the data enable signal D_EN. More particularly, the source buffer 381 and the gamma buffers AMP_G1 to AMP_G10 may be normally driven before the display period DISP starts (for example, before the first horizontal time 1H), and charging time of the source buffer 381 and the gamma buffers AMP_G1 to AMP_G10 may be ensured.

The period in which the source buffer control signal CS_SAP and the gamma buffer control signal CS_AMP have a logic low level has a width smaller than the porch period PORCH, and may be included in the porch period PORCH. In this manner, a margin (for example, one horizontal time 1H) may be ensured based on a start point of time and an end point of time of the porch period PORCH.

Since an operation of the data driver 130 at the sixth point of time t6 is substantially the same as the operation of the data driver 130 at the first point of time t1, redundant descriptions thereof will not be repeated.

FIG. 12 illustrates that the gamma buffer control signal CS_AMP has only the first state value FULL (or a logic high level) in the display period DISP, but the inventive concepts are not limited thereto. For example, as described above with reference to FIG. 8, the gamma buffer control signal CS_AMP may change its state within one horizontal time 1H in response to the horizontal synchronization signal HSYNC. In this case, at least some of the gamma buffers AMP_G1 to AMP_G10 may be turned on and off at intervals of one horizontal time 1H in the display period DISP.

Figure 13:
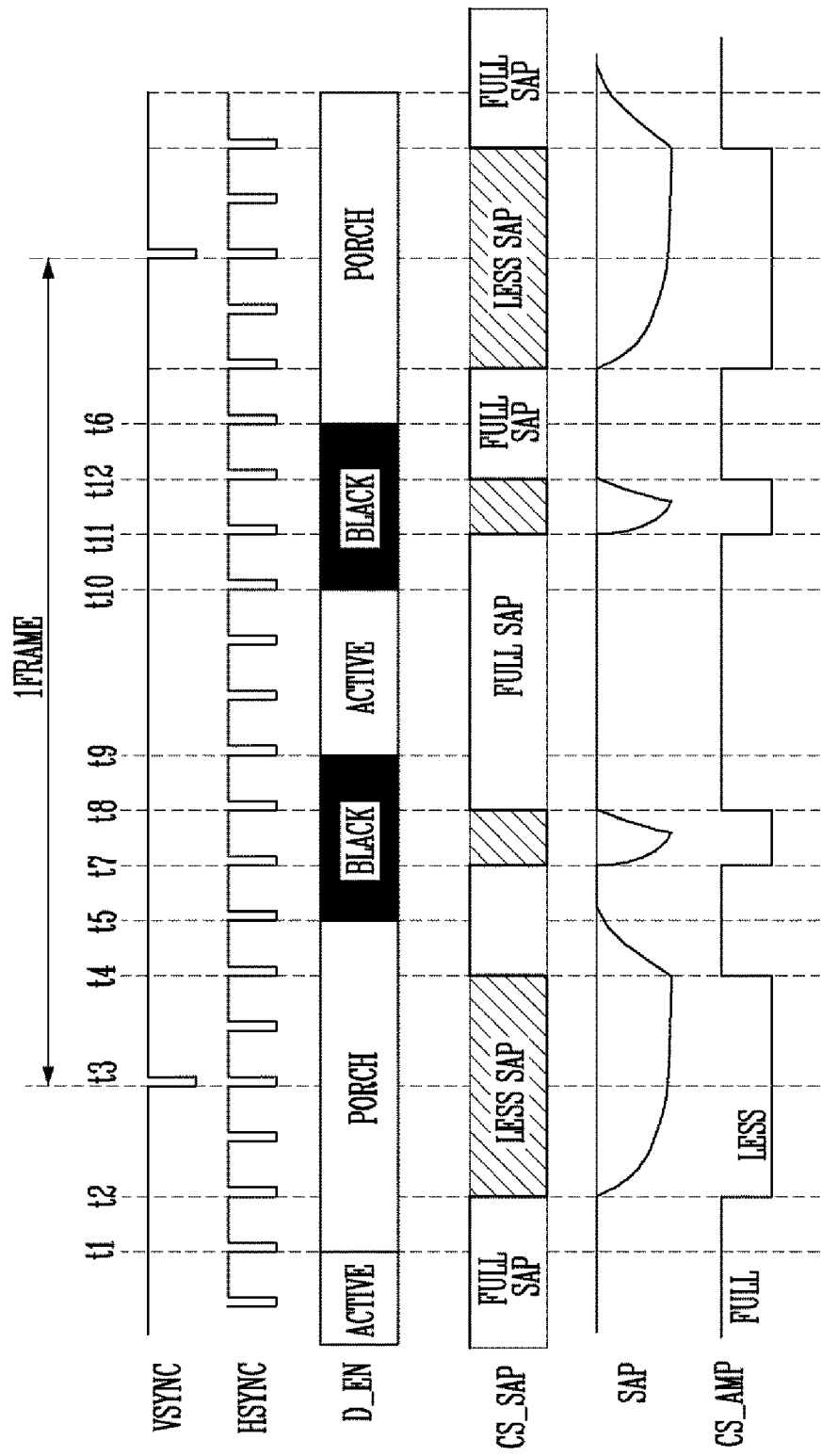
FIG. 13 is another exemplary waveform diagram illustrating an operation of the data driver of FIG. 3.
Figure 14:
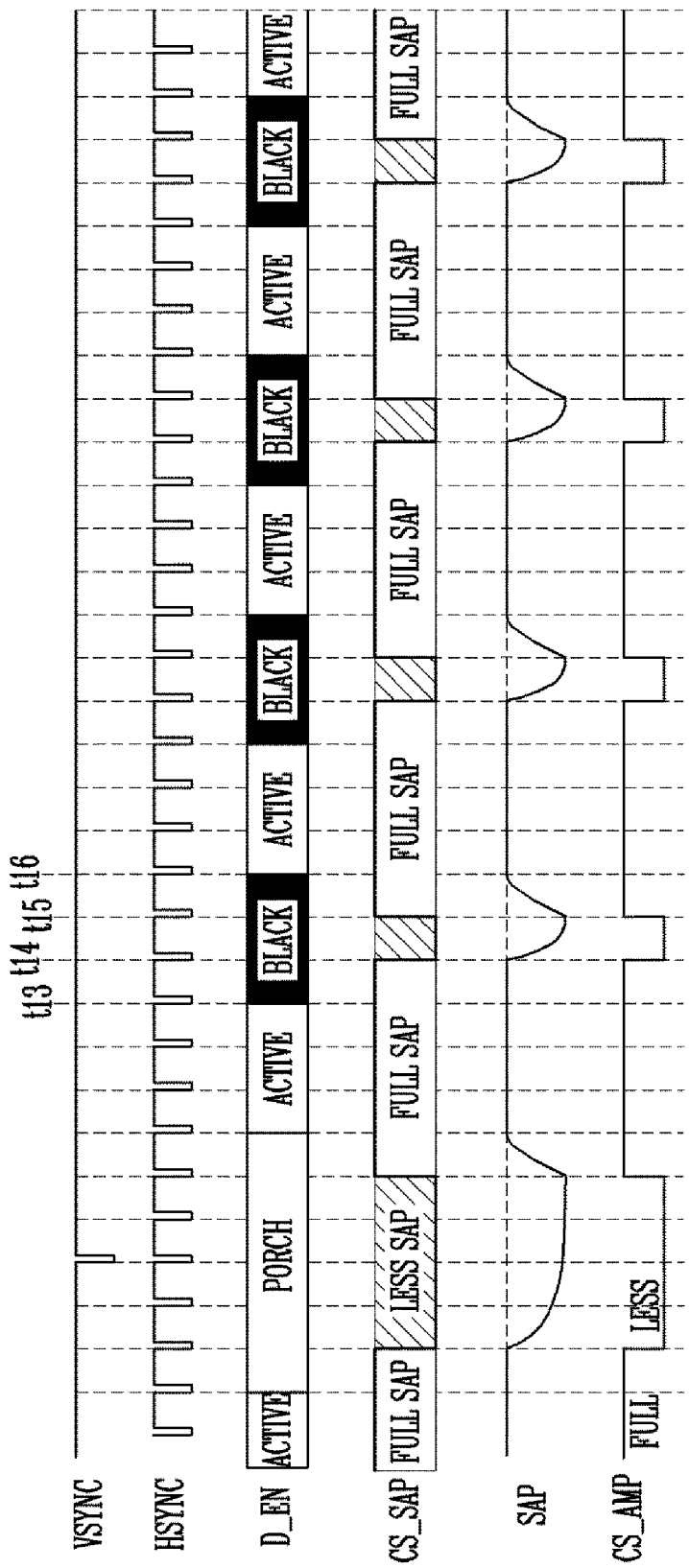
FIG. 14 is still another exemplary waveform diagram illustrating an operation of the data driver of FIG. 3.

FIG. 13 is another exemplary waveform diagram illustrating the operation of the data driver of FIG. 14. FIG. 14 is still another exemplary waveform diagram illustrating the operation of the data driver of FIG. 3. FIGS. 13 and 14 illustrate signals corresponding to FIG. 12.

Referring to FIG. 13, the operation of the data driver 130 in each of the first to sixth point of times t1 to t6 is substantially the same as that described above with reference to FIG. 12 and thus, redundant description thereof will not be repeated.

The data enable signal D_EN may include a valid period ACTIVE and a black period BLACK within the display period DISP. For example, when the display device 100 is driven in a low power mode, in which an image is displayed only in a specific area of the display unit 110, such as a clock image, the image data DATA2 (see FIG. 1) may have a gray scale value valid only for an image (for example, the clock image) in a specific area and may have a black gray scale value (for example, a minimum gray scale value) in the remaining area. The valid period ACTIVE may be a period in which an image corresponding to the valid gray scale value is displayed, and the black period BLACK may be a period in which only an image corresponding to a black gray scale value is displayed.

At the fifth point of time t5, the display period DISP starts in response to the data enable signal D_EN, and the black period may start.

At the seventh point of time t7, the source buffer control signal CS_SAP may be changed to have the second state value LESS SAP from the first state value FULL SAP. This is because power consumption of the source buffer 381 that boosts only the black data voltage is required to be relatively low.

The state value of the source buffer control signal CS_SAP may be changed after the first horizontal time 1H from a point of time when the black period BLACK starts.

The power consumption SAP of the source buffer 381 may be reduced in response to the second state value LESS SAP of the source buffer control signal CS_SAP.

The gamma buffer control signal CS_AMP may be changed to have the second value LESS from the first value FULL. Since only the data signal corresponding to black may be generated in the porch period PCRCH, at least some of the gamma buffers AMP_G1 to AMP_G10 may be turned off. For example, each of the gamma buffers AMP_G1 to AMP_G10 may be turned off. As another example, the second to tenth gamma buffers AMP_G2 to AMP_G10 of the gamma buffers AMP_G1 to AMP_G10 may be turned off, and the first gamma buffer AMP_G1 may maintain a turn-on state. Accordingly, power consumption may be reduced.

In one exemplary embodiment, at the seventh point of time t7, the source buffer control signal CS_SAP may have a third state value. When the source buffer control signal CS_SAP has the third state value, only the first gamma buffer AMP_G1 may maintain the turn-on state and the second to ninth gamma buffers AMP_G2 through AMP_G10 may be turned off. As such, since only the first gamma voltage GV1 is used to realize a black color, only the first gamma buffer AMP_G1 corresponding thereto may maintain the turn-on state. Accordingly, the power consumption may be further reduced.

Thereafter, at the eighth point of time t8, the source buffer control signal CS_SAP may be changed to have the first state value FULL SAP from the second state value LESS SAP, and the gamma buffer control signal CS_AMP may be changed to have the first value FULL from the second value LESS. Thereafter, at the ninth point of time t9, the valid period ACTIVE may start in response to the data enable signal D_EN.

More particularly, as in the operation of the data driver 130 at the fourth point of time t4 and the fifth point of time t5 described above with reference to FIG. 12, the source buffer 381 and the gamma buffers AMP_G1 to AMP_G10 may be normally driven, and charging time of the source buffer 381 and the gamma buffers AMP_G1 to AMP_G10 may be ensured at the eighth point of time t8, which is one horizontal time 1H earlier than the ninth time point t9 when the valid period ACTIVE starts.

Operations of the data driver 130 at a tenth point of time t10, an 11th point of time t11, and a 12th point of time t12 are substantially the same as or similar to the operations of the data driver 130 at the fifth point of time t5, the seventh point of time t7, and the eighth point of time t8, and thus, redundant descriptions thereof will not be repeated.

Although FIG. 13 illustrates that the black period BLACK is located between the porch period PORCH and the valid period ACTIVE, however, the inventive concepts are not limited thereto.

For example, as illustrated in FIG. 14, the black period BALCK may be included in the display period DISP and may be located between the valid period ACTIVE and another valid period ACTIVE. Operations of the data driver 130 (see FIG. 1) at a 13th point of time t13, a 14th point of time t14, a 15th point of time t15, and a 16th point of time t16 are substantially the same as the operations of the data driver 130 at the fifth point of time t5, the seventh point of time t7, the eighth point of time t8, and the ninth point of time t9 described above with reference to FIG. 13, and thus, redundant descriptions thereof will not be repeated.

A gamma voltage generating circuit, a source driver, and a display device according to exemplary embodiments may generate gamma voltages using a resistance string, cause the gamma voltages to change rapidly to ideal gamma voltages by applying representative gamma voltages to tabs of the resistor string using gamma buffers (or gamma amplifiers) in a first period, and remove error components due to offsets of the gamma buffers by turning off (or blocking outputs) at least some of the gamma buffers in a second period. In this manner, the linearity of the gamma voltages may be ensured such that the gamma voltages generated may be the same as ideal gamma voltages.

In addition, the source driver and the display device according to exemplary embodiments may reduce an output of a source buffer (or a source amplifier) and turn off at least some of the gamma buffers in a porch period (e.g., a period between display periods in which an image is displayed) and a black period (e.g., a period in which only a black image is displayed) in the display period. Accordingly, power consumption may be reduced.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
a display panel including a scan line, a data line, and a pixel connected to the scan line and the data line;
a gate driver configured to supply a scan signal to the scan line; and
a source driver configured to supply a data voltage to the data line,
wherein the source driver includes:
a gamma voltage generator configured to generate gamma voltages having voltage levels different from each other in response to a gamma enable signal;
a digital-to-analog converter configured to generate the data voltage corresponding to a gray scale value using the gamma voltages; and
a source buffer configured to output the data voltage to the data line, wherein the gamma voltage generator includes:
a first resistor string configured to set a voltage range of the gamma voltages;
a second resistor string configured to set tab gamma voltages corresponding to some of the gamma voltages within the voltage range;
gamma buffers configured to output the tab gamma voltages; and
a third resistor string including tabs respectively connected to output terminals of the gamma buffers, the third resistor string being configured to divide a voltage between the tabs to generate the gamma voltages,
wherein the gamma voltage generator, in response to the gamma enable signal, outputs the tab gamma voltages during a part of a horizontal time and stops outputting some of the tab gamma voltages during a rest of the horizontal time, and
wherein the scan signal has a turn-off voltage level in the part of the horizontal time.

2. The display device according to claim 1, wherein the horizontal time is a cycle of a horizontal synchronization signal, and
wherein the source driver supplies the data voltage to the data line at intervals of the one horizontal time.

3. The display device according to claim 1, wherein at least some of the tab gamma voltages correspond to inflection points of the gamma voltages having nonlinear characteristics.

4. The display device according to claim 1, wherein the first resistor string divides a voltage between a first reference voltage and a second reference voltage, and
wherein one of divided voltages by the first resistor string is used as a maximum voltage of the voltage range of the gamma voltages, and another of the divided voltages by the first resistor string is used as a minimum voltage of the voltage range of the gamma voltages.

5. The display device according to claim 1, wherein, in response to the gamma enable signal, the gamma buffers are turned on during the part of the horizontal time and some of the gamma buffers are turned off during the rest of the horizontal time.

6. The display device according to claim 5, wherein the scan signal has a turn-on voltage level in the rest of the horizontal time.

7. The display device according to claim 6, wherein the some of the gamma buffers are turned off at a point of time when the scan signal is shifted from the turn-off voltage level to the turn-on voltage level.

8. The display device according to claim 6, wherein at least some of the gamma buffers are turned off after a point of time when the scan signal is shifted from the turn-off voltage level to the turn-on voltage level.

9. The display device according to claim 5, wherein a first gamma buffer of the gamma buffers connected to an uppermost tab of the third resistor string maintains a turn-on state in the horizontal time, and
wherein a second gamma buffer of the gamma buffers connected to a lowermost tab of the third resistor string maintains the turn-on state in the horizontal time.

10. The display device according to claim 9, wherein the gamma buffers, except for the first and second gamma buffers, are turned off in the rest of the horizontal time.

11. The display device according to claim 9, wherein a third gamma buffer of the gamma buffers that is farthest from the first and second gamma buffers maintains the turn-on state in the second period.

12. The display device according to claim 9, wherein a first group of the gamma buffers further includes a fourth gamma buffer of the gamma buffers that is adjacent to the first gamma buffer or the second gamma buffer.

13. The display device of claim 1, wherein a frame period includes a display period in which an image is displayed and a porch period between the display period and another display period,
   wherein the source buffer is turned off in the porch period and is turned on in the display period, and
   wherein at least some of the gamma buffers are turned off in the porch period and are turned on in the display period.

14. A display device comprising:
   a display panel including a scan line, a data line, and a pixel connected to the scan line and the data line;
   a gate driver configured to supply a scan signal to the scan line; and
   a source driver configured to supply a data voltage to the data line,
   wherein the source driver includes:
      a gamma voltage generator configured to generate gamma voltages having voltage levels different from each other in response to a gamma enable signal;
      a digital-to-analog converter configured to generate the data voltage corresponding to a gray scale value using the gamma voltages; and
      a source buffer configured to output the data voltage to the data line,
   wherein the gamma voltage generator includes:
      a first resistor string configured to set a voltage range of the gamma voltages;
      a second resistor string configured to set tab gamma voltages corresponding to some of the gamma voltages within the voltage range;
      gamma buffers configured to output the tab gamma voltages; and
      a third resistor string including tabs respectively connected to output terminals of the gamma buffers, the third resistor string being configured to divide a voltage between the tabs to generate the gamma voltages,
   wherein a frame period includes a display period in which an image is displayed and a porch period between the display period and another display period,
   wherein the source buffer is turned off in the porch period and is turned on in the display period, and
   wherein at least some of the gamma buffers are turned off during a part of the porch period and are turned on during a rest of the porch period.

15. The display device according to claim 13, wherein the display period includes a black period in which a black image is displayed and a valid period different from the black period,
   wherein the source buffer is turned off in the black period and is turned on in the valid period, and
   wherein the at least some of the gamma buffers are turned off in the black period and are turned on in the valid period.

16. The display device according to claim 15, wherein a first gamma buffer connected to an uppermost tab of the third resistor string maintains a turn-on state in the black period, and
   wherein the remaining gamma buffers except for the first gamma buffer are turned off in the black period.

17. The display device according to claim 15, wherein the at least some of the gamma buffers are turned off during a part of the black period and are turned on during a rest of the black period.

18. A source driver comprising:
   a gamma voltage generator configured to generate gamma voltages having voltage levels different from each other in response to a gamma enable signal;
   a digital-to-analog converter configured to generate a data voltage corresponding to a grayscale value using the gamma voltages; and
   a source buffer configured to output the data voltage to a data line,
   wherein the gamma voltage generator includes:
      a first resistor string configured to divide a voltage between a first reference voltage and a second reference voltage;
      a second resistor string configured to divide a voltage between two selected voltages among voltages divided by the first resistor string;
      gamma buffers configured to output some of voltages divided by the second resistor string as tab gamma voltages; and
      a third resistor string including tabs respectively connected to output terminals of the gamma buffers, the third resistor string being configured to divide a voltage between the tabs to generate the gamma voltages, and
   wherein the gamma voltage generator, in response to the gamma enable signal, turns on the gamma buffers during a part of a horizontal time and turns off some of the gamma buffers during a rest of the horizontal time, and
   wherein the data voltage is not provided to a pixel in the part of the horizontal time.

19. The source driver according to claim 18, wherein the horizontal time is a cycle of a horizontal synchronization signal, and
   wherein the source driver outputs the data voltage at intervals of the one horizontal time.

20. The source driver according to claim 18, wherein at least some of the tab gamma voltages correspond to inflection points of the gamma voltages having nonlinear characteristics.

* * * * *